United States Patent
Morioka et al.

(10) Patent No.: US 9,288,474 B2
(45) Date of Patent: Mar. 15, 2016

(54) IMAGE DEVICE AND IMAGE PROCESSING METHOD FOR GENERATING CONTROL INFORMATION INDICATING THE DEGREE OF STEREOSCOPIC PROPERTY OR WHETHER OR NOT 3D IMAGE NEEDS TO BE OUTPUTTED

(71) Applicant: Panasonic Corporation, Osaka (JP)

(72) Inventors: Yoshihiro Morioka, Nara (JP); Tadashi Nagai, Osaka (JP); Takeshi Hamasaki, Osaka (JP); Koichi Toyomura, Osaka (JP); Takanori Yabuki, Osaka (JP); Kenji Matsuura, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 468 days.

(21) Appl. No.: 13/714,688

(22) Filed: Dec. 14, 2012

(65) Prior Publication Data

US 2013/0100254 A1    Apr. 25, 2013

Related U.S. Application Data

(63) Continuation of application No. PCT/JP2011/004856, filed on Aug. 31, 2011.

(30) Foreign Application Priority Data

Aug. 31, 2010  (JP) ................................. 2010-193448

(51) Int. Cl.
*H04N 13/02* (2006.01)
*H04N 13/00* (2006.01)
*G03B 35/10* (2006.01)

(52) U.S. Cl.
CPC ............ *H04N 13/0239* (2013.01); *G03B 35/10* (2013.01); *H04N 13/0025* (2013.01);
(Continued)

(58) Field of Classification Search
CPC .......................... H04N 13/025; H04N 13/0289
USPC ............................................................. 348/47
See application file for complete search history.

(56) References Cited

U.S. PATENT DOCUMENTS 4,199,785 A * 4/1980 McCullough et al. ........ 348/704
5,313,239 A * 5/1994 Mizukawa .................... 396/471
(Continued)

FOREIGN PATENT DOCUMENTS

JP       07-298307 A    11/1995
JP    2005-020606 A     1/2005
(Continued)

OTHER PUBLICATIONS

International Search Report for corresponding International Application No. PCT/JP2011/004856 mailed Nov. 1, 2011.
(Continued)

*Primary Examiner* — Jay Patel
*Assistant Examiner* — Francis G Geroleo
(74) *Attorney, Agent, or Firm* — Renner, Otto, Boisselle & Sklar, LLP

(57) ABSTRACT

An image capture device includes: first and second shooting sections, each of which is configured to shoot an image of a subject; and a signal processing section configured to generate, based on first and second images that have been shot by the first and second shooting sections, respectively, information indicating the amount of parallax between the first and second images. Based on at least one of the states of the first and second images, a zoom power during shooting, and the tilt of the image capture device during shooting, the signal processing section generates control information indicating the degree of stereoscopic property of a 3D image to be generated based on the first and second images or indicating whether or not the 3D image needs to be output, and records the control information and the information indicating the amount of parallax.

12 Claims, 26 Drawing Sheets

(52) U.S. Cl.
CPC ......... *H04N13/025* (2013.01); *H04N 13/0242* (2013.01); *H04N 13/0285* (2013.01); *H04N 13/0296* (2013.01); *H04N 2013/0081* (2013.01)

(56) References Cited

U.S. PATENT DOCUMENTS

| | | | |
|---|---|---|---|
| 6,141,036 | A | 10/2000 | Katayama et al. |
| 6,614,927 | B1 | 9/2003 | Tabata |
| 6,847,392 | B1 | 1/2005 | House |
| 6,864,910 | B1 | 3/2005 | Ogino et al. |
| 2001/0019621 | A1 | 9/2001 | Hanna et al. |
| 2005/0089212 | A1 | 4/2005 | Mashitani et al. |
| 2005/0134709 | A1* | 6/2005 | Ishii et al. ................ 348/240.99 |
| 2006/0187338 | A1* | 8/2006 | May et al. ..................... 348/375 |
| 2008/0117290 | A1* | 5/2008 | Mazza ............................ 348/47 |
| 2008/0218612 | A1* | 9/2008 | Border et al. ................. 348/262 |
| 2011/0090313 | A1* | 4/2011 | Tsuchita ......................... 348/46 |
| 2011/0292045 | A1 | 12/2011 | Nakamura et al. |
| 2012/0002014 | A1* | 1/2012 | Walsh ............................. 348/47 |

FOREIGN PATENT DOCUMENTS

| | | |
|---|---|---|
| JP | 2005-210217 A | 8/2005 |
| JP | 2010-206774 A | 9/2010 |
| JP | 2011-119995 A | 6/2011 |
| JP | 2002-524937 T | 8/2012 |

OTHER PUBLICATIONS

International Preliminary Report on Patentability for corresponding International Application No. PCT/JP2011/004856 mailed Aug. 7, 2012.
Co-pending U.S. Appl. No. 13/714,736, filed Dec. 14, 2012.
Co-pending U.S. Appl. No. 13/714,766, filed Dec. 14, 2012.

* cited by examiner

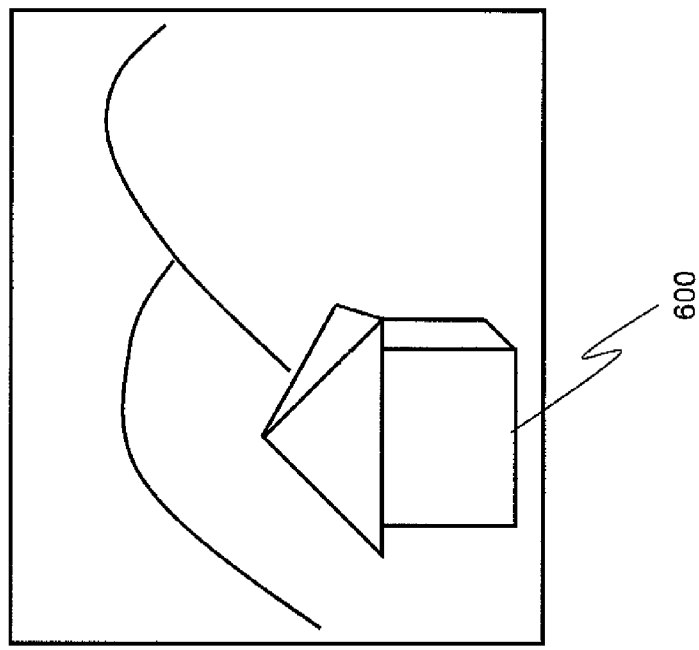
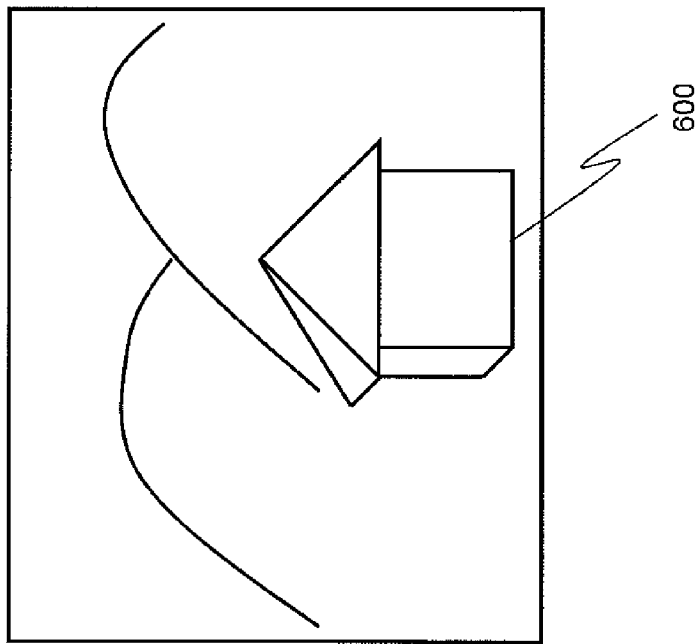
FIG.6

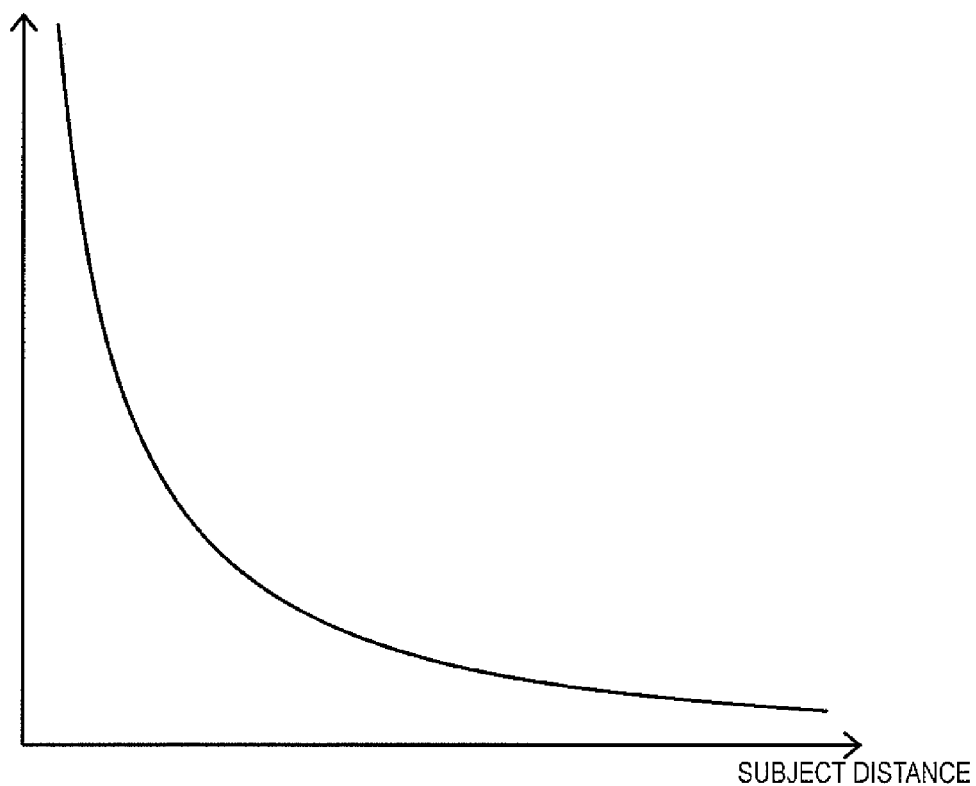

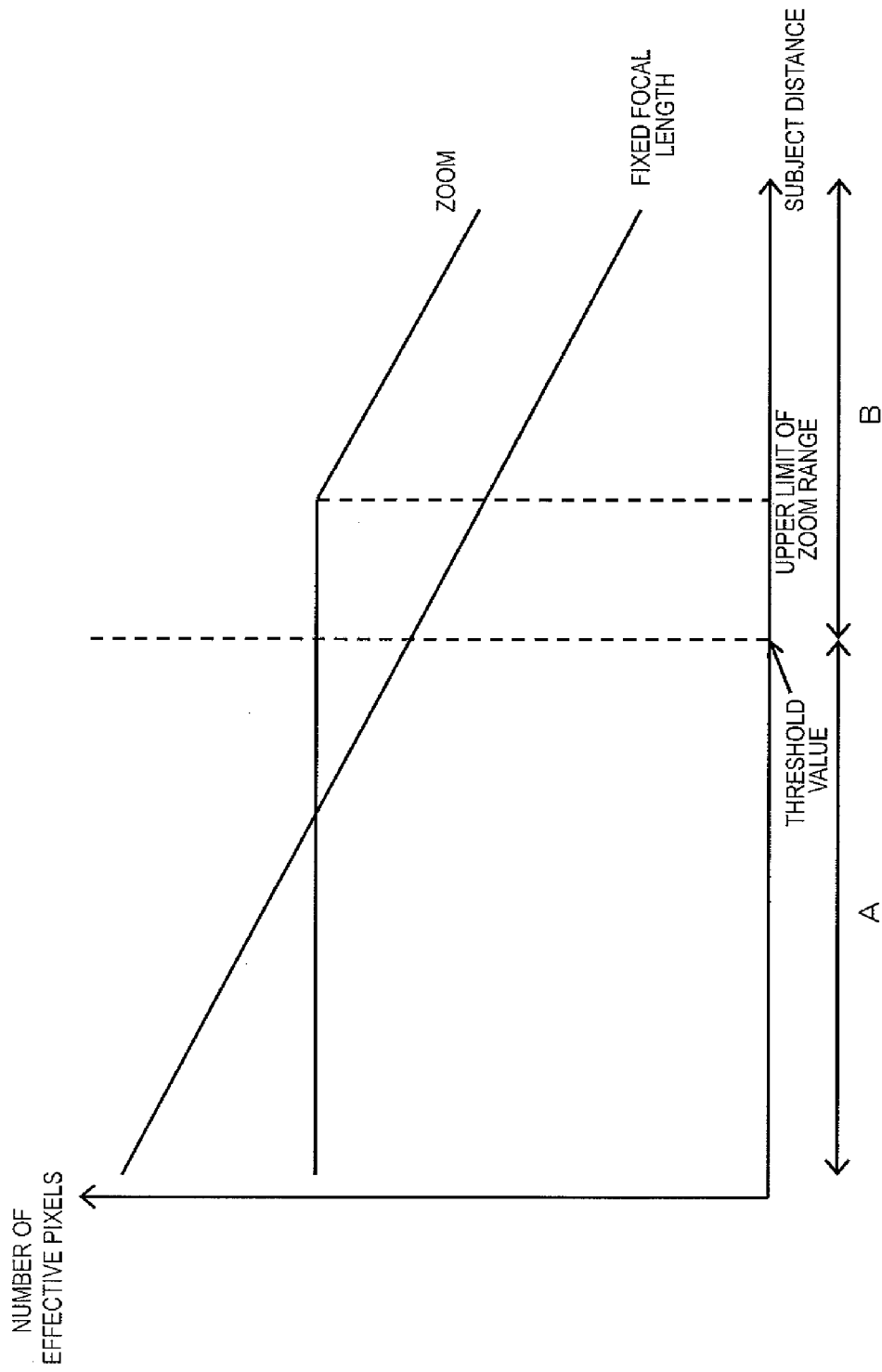

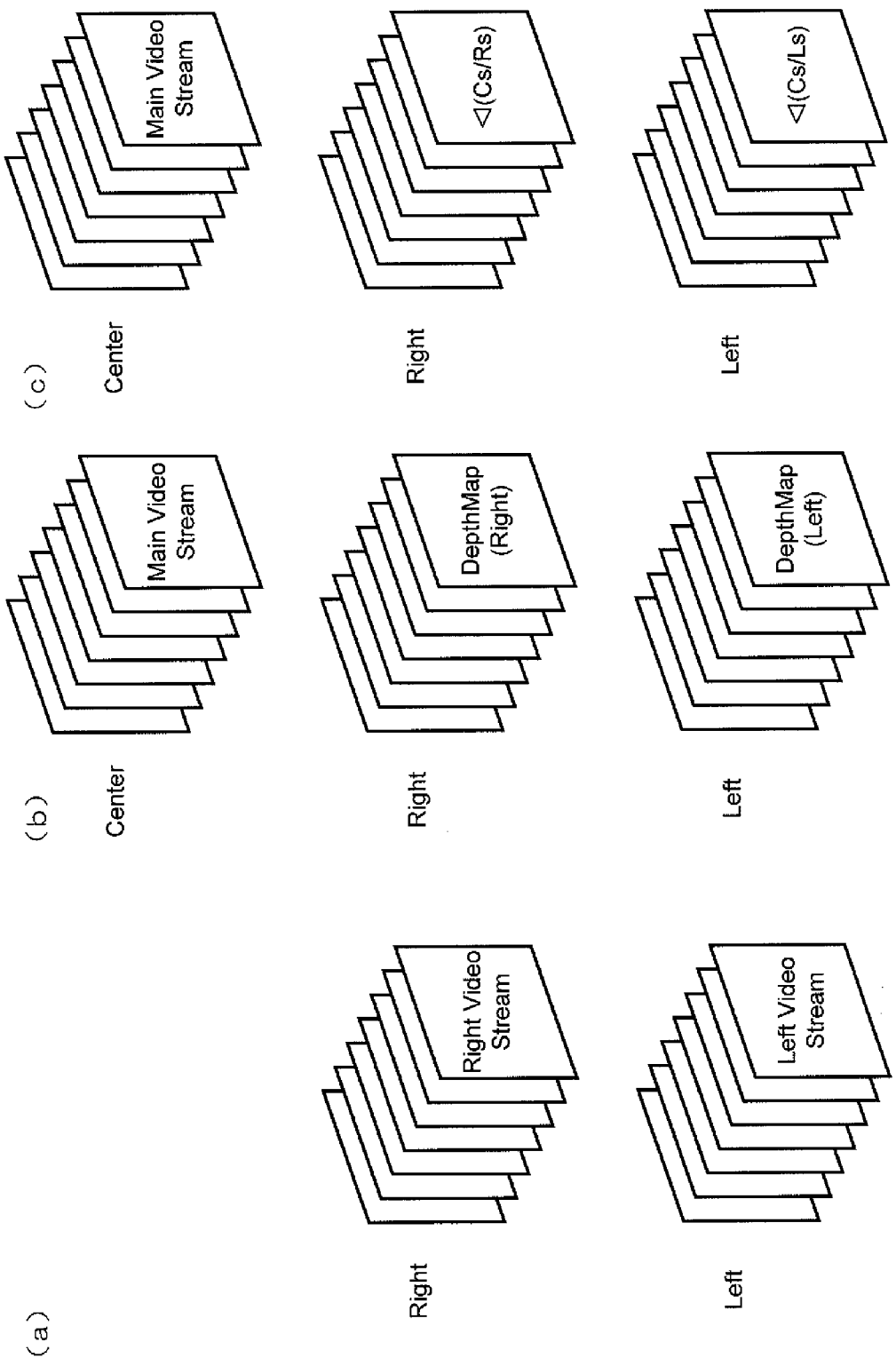

IMAGE DEVICE AND IMAGE PROCESSING METHOD FOR GENERATING CONTROL INFORMATION INDICATING THE DEGREE OF STEREOSCOPIC PROPERTY OR WHETHER OR NOT 3D IMAGE NEEDS TO BE OUTPUTTED

This is a continuation of International Application No. PCT/JP2011/004856, with an international filing date of Aug. 31, 2011, which claims priority of Japanese Patent Application No. 2010-193448, filed on Aug. 31, 2010, the contents of which are hereby incorporated by reference.

BACKGROUND

1. Technical Field

The present disclosure relates to an image capture device and image processing method for getting information to generate a 3 D image by making multiple shooting sections capture multiple images.

2. Description of the Related Art

To view and listen to 3D video, content (i.e., data such as a video stream) corresponding to the 3D video needs to be gotten in one way or another. One way of getting such content is to generate 3D video with a camera that can shoot video.

Japanese Laid-Open Patent Publication No. 2005-20606 (hereinafter called "Patent document No. 1") discloses a digital camera with two image capturing sections, which are called a "main image capturing section" and a "sub-image capturing section", respectively. According to the technique disclosed in Patent document No. 1, a parallax is detected between the two video frames captured by the main and sub-image capturing sections, respectively, the video captured by the main image capturing section is used as a main image, and a sub-image is generated based on the main image and the parallax, thereby generating right- and left-eye images to form 3D video.

Japanese Laid-Open Patent Publication No. 2005-210217 (hereinafter called "Patent document No. 2") discloses a technique for shooting 3D video even if the two image capturing systems of a stereo camera use mutually different zoom powers for shooting.

SUMMARY

The cameras disclosed in Patent Documents Nos. 1 and 2 shoot 3D video continuously. That is why even an object that would not give a stereoscopic impression to the viewer is also shot to generate 3D video. The same problem arises in not just video but in still pictures as well.

One non-limiting and exemplary embodiment of the present disclosure provides a technique to change the modes of shooting from a 3D image shooting mode into an ordinary 2D image shooting mode, or vice versa, appropriately according to the condition of shooting.

In one general aspect, an image capture device disclosed herein comprises: first and second shooting sections, each of which is configured to shoot an image of a subject; and a signal processing section configured to generate, based on first and second images that have been shot by the first and second shooting sections, respectively, information indicating the amount of parallax between the first and second images. Based on at least one of the states of the first and second images, a zoom power during shooting, and the tilt of the image capture device during shooting, the signal processing section generates control information indicating the degree of stereoscopic property of a 3D image to be generated based on the first and second images or indicating whether or not the 3D image needs to be output, and records the control information and the information indicating the amount of parallax.

Another image capture device according to the present disclosure includes: first and second shooting sections, each of which is configured to shoot an image of a subject; and a signal processing section configured to generate, based on first and second images that have been shot by the first and second shooting sections, respectively, information indicating the amount of parallax between the first and second images. The signal processing section determines whether or not the information indicating the amount of parallax needs to be recorded based on the states of the first and second images and/or a shooting condition.

Still another image capture device according to the present disclosure includes: first and second shooting sections, each of which is configured to shoot an image of a subject; and a signal processing section configured to generate, based on first and second images that have been shot by the first and second shooting sections, respectively, information indicating the amount of parallax between the first and second images. The signal processing section generates a 3D image based on the first image and an image to be generated from the information indicating the amount of parallax and the first image, and determines, based on at least one of the states of the first and second images, a zoom power during shooting, and the tilt of the image capture device during shooting, whether or not the 3D image needs to be generated.

According to the above aspects, the modes of shooting (or generation) can be switched from a 3D image shooting (or generating) mode into an ordinary 2D image shooting (or generating) mode, or vice versa, appropriately according to the condition of shooting.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 6 shows a difference between the video frames captured by main and sub-shooting sections in the first embodiment.

FIG. 13 is a graph showing a relation between the subject distance and the degree of stereoscopic property.

FIG. 14 is a graph showing a relation between the subject distance and the number of effective pixels of the subject that has been shot by the main and sub-shooting sections.

FIG. 24 illustrates exemplary methods for recording video generated according to the second embodiment.

DETAILED DESCRIPTION

Hereinafter, embodiments of the present disclosure will be described with reference to the accompanying drawings. In this description, the "image" is supposed herein to be a concept that covers both a moving picture (video) and a still picture alike. Also, in the following description, a signal or information representing an image or video will be sometimes simply referred to herein as an "image" or "video".

(Embodiment 1)

<Configuration of Video Shooting Device>

Figure 1A:
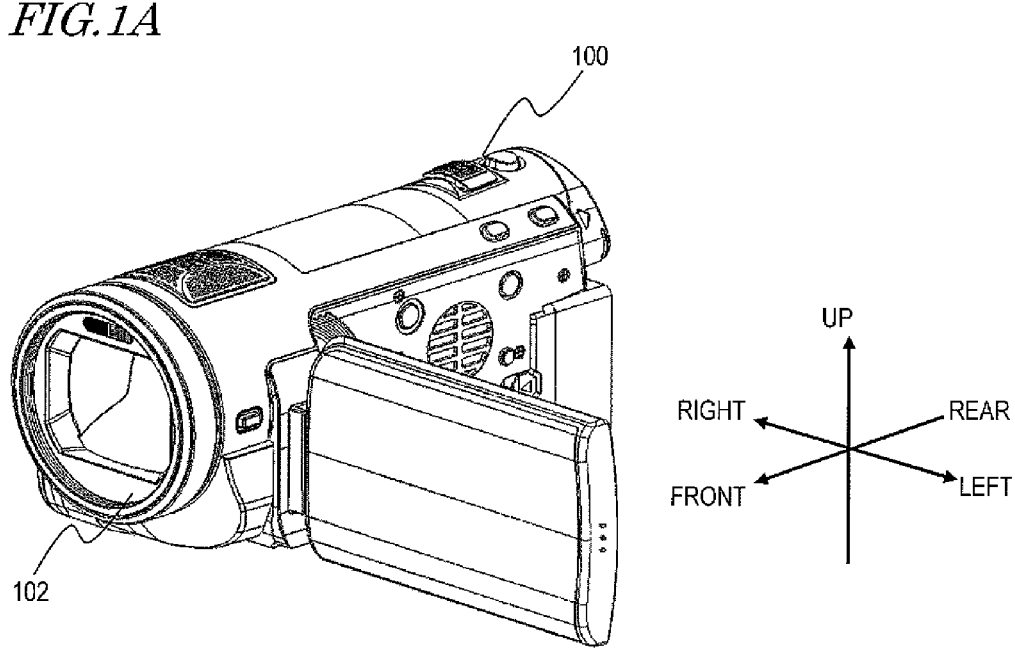
FIG. 1A illustrates the appearance of an ordinary camcorder.
Figure 1B:
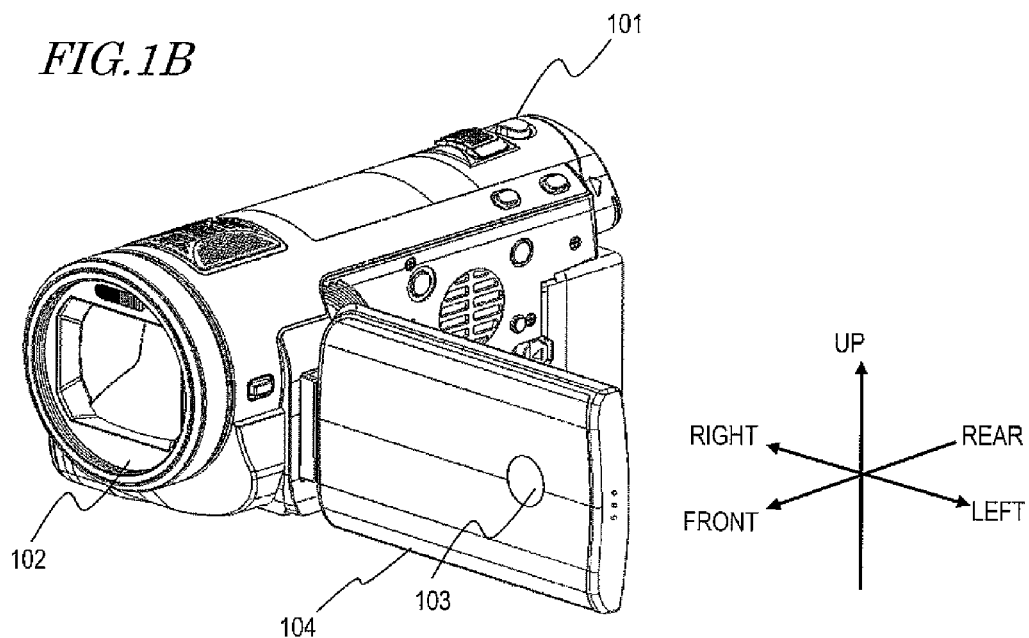
FIG. 1B illustrates the appearance of a camcorder according to a first embodiment of the present disclosure.

FIGS. 1A and 1B are perspective views illustrating the appearances of an ordinary video shooting device (which will be referred to herein as a "camcorder") and a camcorder as an embodiment of the present disclosure, respectively. Specifically, FIG. 1A illustrates an ordinary camcorder 100 for shooting video or still pictures. On the other hand, FIG. 1B illustrates a camcorder 101 according to this embodiment. These two camcorders 100 and 101 have different appearances because the camcorder 101 has not only a first lens unit 102 but also a second lens unit 103 as well. In shooting video, the ordinary camcorder 100 condenses the incoming light through only the first lens unit 102. Meanwhile, the camcorder 101 of this embodiment condenses the incoming light through the two different optical systems including the first and second lens units 102 and 103, respectively, thereby shooting two video clips with parallax (i.e., 3D video), which is a major difference from the ordinary camcorder 100. The second lens unit 103 has a smaller volumetric size than the first lens unit 102. In this description, the "volumetric size" refers herein to a size represented by the volume that is determined by the aperture and thickness of each lens unit. With such a configuration adopted, the camcorder 101 shoots video by using the two different optical systems.

The distance between the first and second lens units 102 and 103 affects the amount of parallax of the video to shoot. That is why if the distance between the first and second lens units 102 and 103 is set to be approximately as long as the interval between the right and eyes of a person, then the resultant 3D video would look more natural to his or her eye than the 3D video shot with the camcorder 101.

Furthermore, it is recommended that when the camcorder 101 is put on the ground, for example, the first and second lens units 102 and 103 be substantially level with each other. The reason is that as a person normally looks at an object with his or her right and left eyes substantially level with each other, he or she is used to a horizontal parallax but not familiar with a vertical parallax. That is why 3D video is suitably shot so as to produce parallax horizontally, not vertically. The more significantly the positions of the first and second lens units 102 and 103 shift from each other vertically, the more unnatural the 3D video generated by this camcorder 101 could look to the viewer.

Also, it is recommended that the respective optical centers of the first and second lens units 102 and 103 be located on a single plane that is parallel to the image capturing plane of the camcorder 101. That is to say, the optical center of the first lens unit 102 should not be too close to the subject (i.e., should not project forward), and the optical center of the second lens unit 103 should not be too distant from the subject (i.e., should not retract backward), or vice versa. If the first and second lens units 102 and 103 are located at such positions, then the distance from the first lens unit 102 to the subject becomes different from the distance from the second lens unit 103 to the subject. In that case, it could be difficult to get accurate parallax information. For that reason, the first and second lens units 102 and 103 should be located at substantially the same distance from the subject. Strictly speaking, in this respect, the relative positions of those lens units to the respective image capturing planes of the image sensors that are arranged behind them also need to be taken into consideration.

The closer to the ideal ones the relative positions of these first and second lens units 102 and 103 are, the less the computational complexity of the signal processing to get done to generate 3D video based on the video that has been shot with these lens units. More specifically, if the first and second lens units 102 and 103 satisfy such a positional relation, then the positions of the same subject on the right and left video screens of the 3D video satisfy the Epipolar constraint condition. That is why if the position of the subject on one video screen has been determined in the signal processing for generating 3D video to be described later, the position of the same subject on the other video screen can be calculated relatively easily.

In the camcorder 101 shown in FIG. 1B, the first lens unit 102 is arranged at the frontend of the camcorder's (101) body just like the ordinary one, -while the second lens unit 103 is arranged on the back of a monitor section 104 which is used to monitor the video to be shot. The monitor section 104 displays the video that has been shot on the opposite side from the light impinging on the first and second lens units 102 and 103 (i.e., on the back side of the camcorder 101). In the example illustrated in FIG. 1B, the camcorder 101 processes the video that has been shot through the first lens unit 102 as right-eye viewpoint video and the video that has been shot through the second lens unit 103 as left-eye viewpoint video, respectively. Furthermore, considering the ideal positional relation between the first and second lens units 102 and 103, the second lens unit 103 is suitably arranged so that the distance from the second lens unit 103 to the first lens unit 102 on the back of the monitor section 104 becomes approximately as long as the interval between a person's right and left eyes (e.g., 4 to 6 cm) and that the first and second lens units 102 and 103 are located on the same plane that is substantially parallel to the image capturing plane.

Figure 2:
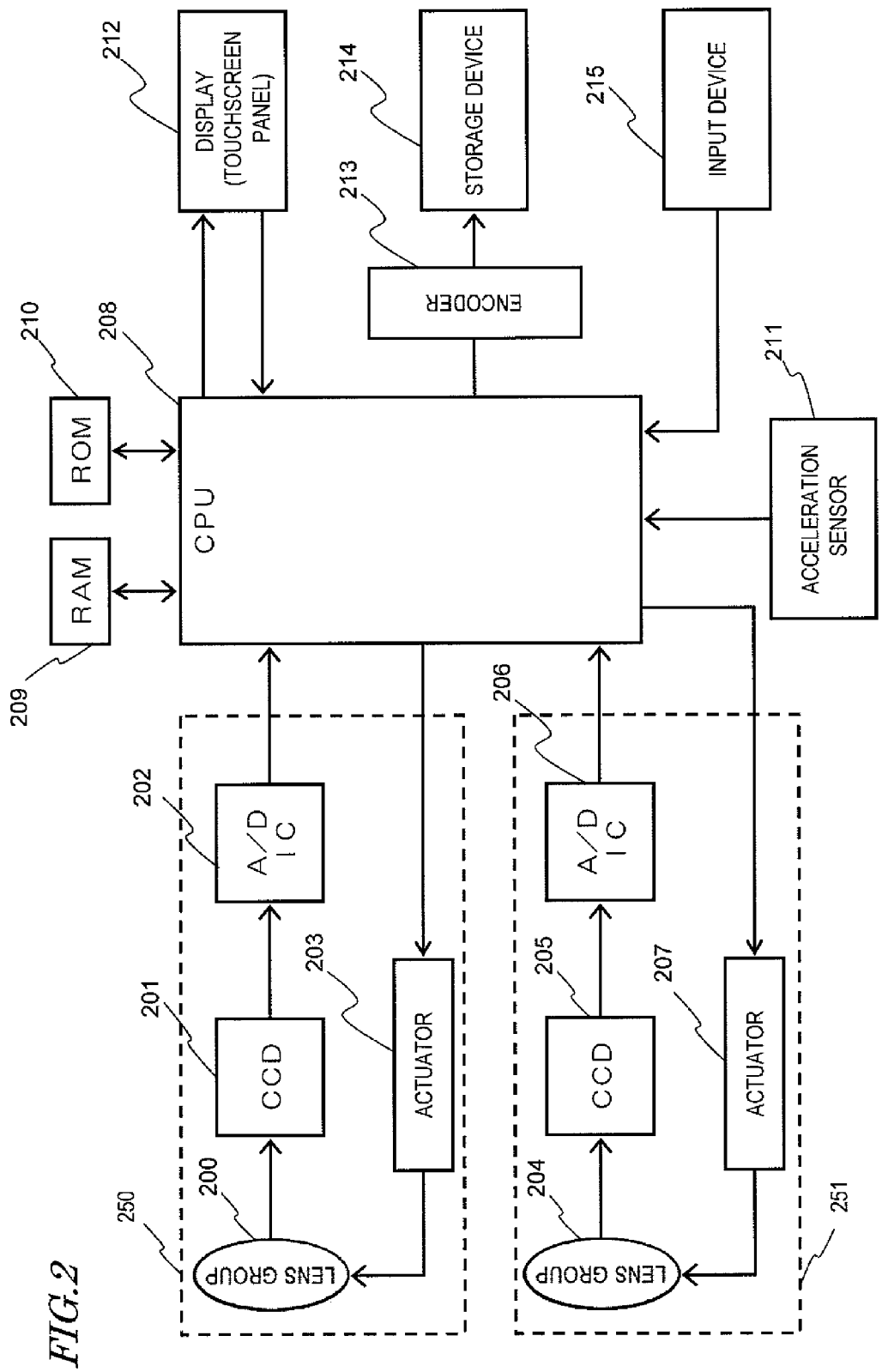
FIG. 2 is a block diagram illustrating a hardware configuration for the camcorder of the first embodiment.

FIG. 2 illustrates generally an internal hardware configuration for the camcorder 101 shown in FIG. 1B. The hardware configuration of the camcorder 101 includes a first shooting unit (which will be referred to herein as a "main shooting unit") 250, a second shooting unit (which will be referred to herein as a "sub-shooting unit") 251, a CPU 208, a RAM 209, a ROM 210, an acceleration sensor 211, a display 212, an encoder 213, a storage device 214, and an input device 215. The main shooting unit 250 includes a first group of lenses 200, a CCD 201, an A/D converting IC 202, and an actuator 203. The sub-shooting unit 251 includes a second group of lenses 204, a CCD 205, an A/D converting IC 206, and an actuator 207. The first group of lenses 200 is an optical system comprised of multiple lenses that are included in the first lens unit 102 shown in FIG. 1B. The second group of lenses 204 is an optical system comprised of multiple lenses that are included in the second lens unit 103 shown in FIG. 1B.

The first group of lenses 200 optically adjusts, through multiple lenses, the incoming light that has come from the subject. Specifically, the first group of lenses 200 has a zoom function for zooming in on, or zooming out of, the subject to be shot and a focus function for adjusting the definition of the subject's contour on the image capturing plane.

The CCD 201 is an image sensor which converts the light that has been incident on the first group of lenses 200 from the subject into an electrical signal. Although a CCD (charge-coupled device) is supposed to be used in this embodiment, this is just an example of the present disclosure. Alternatively, any other sensor such as a CMOS (complementary metal oxide semiconductor) image sensor may also be used as long as the incoming light can be converted into an electrical signal.

The A/D converting IC 202 converts the analog electrical signal that has been generated by the CCD 201 into a digital electrical signal.

The actuator 203 has a motor and adjusts the distance between the multiple lenses included in the first group of lenses 200 and the position of a zoom lens under the control of the CPU 208 to be described later.

The second group of lenses 204, CCD 205, A/D converting IC 206, and actuator 207 of the sub-shooting unit 251 respectively correspond to the first group of lenses 200, CCD 201, A/D converting IC 202, and actuator 203 of the main shooting unit 250. Thus, only different parts from the main shooting unit 250 will be described with description of their common parts omitted.

The second group of lenses 204 is made up of multiple lenses, of which the volumetric sizes are smaller than those of the lenses that form the first group of lenses 200. Specifically, the aperture of the objective lens in the second group of lenses is smaller than that of the objective lens in the first group of lenses. This is because if the sub-shooting unit 251 has a smaller size than the main shooting unit 250, the overall size of the camcorder 101 can also be reduced. In this embodiment, in order to reduce the size of the second group of lenses 204, the second group of lenses 204 does not have a zoom function. That is to say, the second group of lenses 204 forms a fixed focal length lens.

The CCD 205 has a resolution that is either as high as, or higher than, that of the CCD 201 (i.e., has a greater number of pixels both horizontally and vertically than the CCD 201). The CCD 205 of the sub-shooting unit 251 has a resolution that is either as high as, or higher than, that of the CCD 201 of the main shooting unit 250 in order to avoid debasing the image quality when the video that has been shot with the sub-shooting unit 251 is subjected to electronic zooming (i.e., have its angle of view aligned) through the signal processing to be described later.

The actuator 207 has a motor and adjusts the distance between the multiple lenses included in the second group of lenses 204 under the control of the CPU 208 to be described later. Since the second group of lenses 204 has no zoom function, the actuator 207 makes the lens adjustment in order to perform a focus control.

The CPU (central processing unit) 208 controls the entire camcorder 101, and performs the processing of generating 3D video based on the video that has been shot with the main and sub-shooting units 250 and 251. Optionally, similar processing may also be carried out by using an FPGA (field programmable gate array) instead of the CPU 208.

The RAM (random access memory) 209 temporarily stores various variables and other data when a program that makes the CPU 208 operate is executed in accordance with the instruction given by the CPU 208.

The ROM (read-only memory) 210 stores program data, control parameters and other kinds of data to make the CPU 208 operate.

The acceleration sensor 211 detects the shooting state (such as the posture or orientation) of the camcorder 101. Although the acceleration sensor 211 is supposed to be used in this embodiment, this is only an example of the present disclosure. A tri-axis gyrosensor may also be used as an alternative sensor. That is to say, any other sensor may also be used as long as it can detect the shooting state of the camcorder 101.

The display 212 displays the 3D video that has been shot by the camcorder 101 and processed by the CPU 208 and other components. Optionally, the display 212 may have a touch-screen panel as an input device.

The encoder 213 encodes various kinds of data including information about the 3D video that has been generated by the CPU 208 and necessary information to display the 3D video in a predetermined format.

The storage device 214 stores and retains the data that has been encoded by the encoder 213. The storage device 214 may be implemented as a magnetic recording disc, an optical storage disc, a semiconductor memory or any other kind of storage medium as long as data can be written on it.

The input device 215 accepts an instruction that has been externally given to the camcorder 101 by the user, for example.

Hereinafter, the functional configuration of the camcorder 101 will be described. In the following description, the respective constituting elements of the camcorder 101 will be represented by their corresponding functional blocks.

Figure 3:
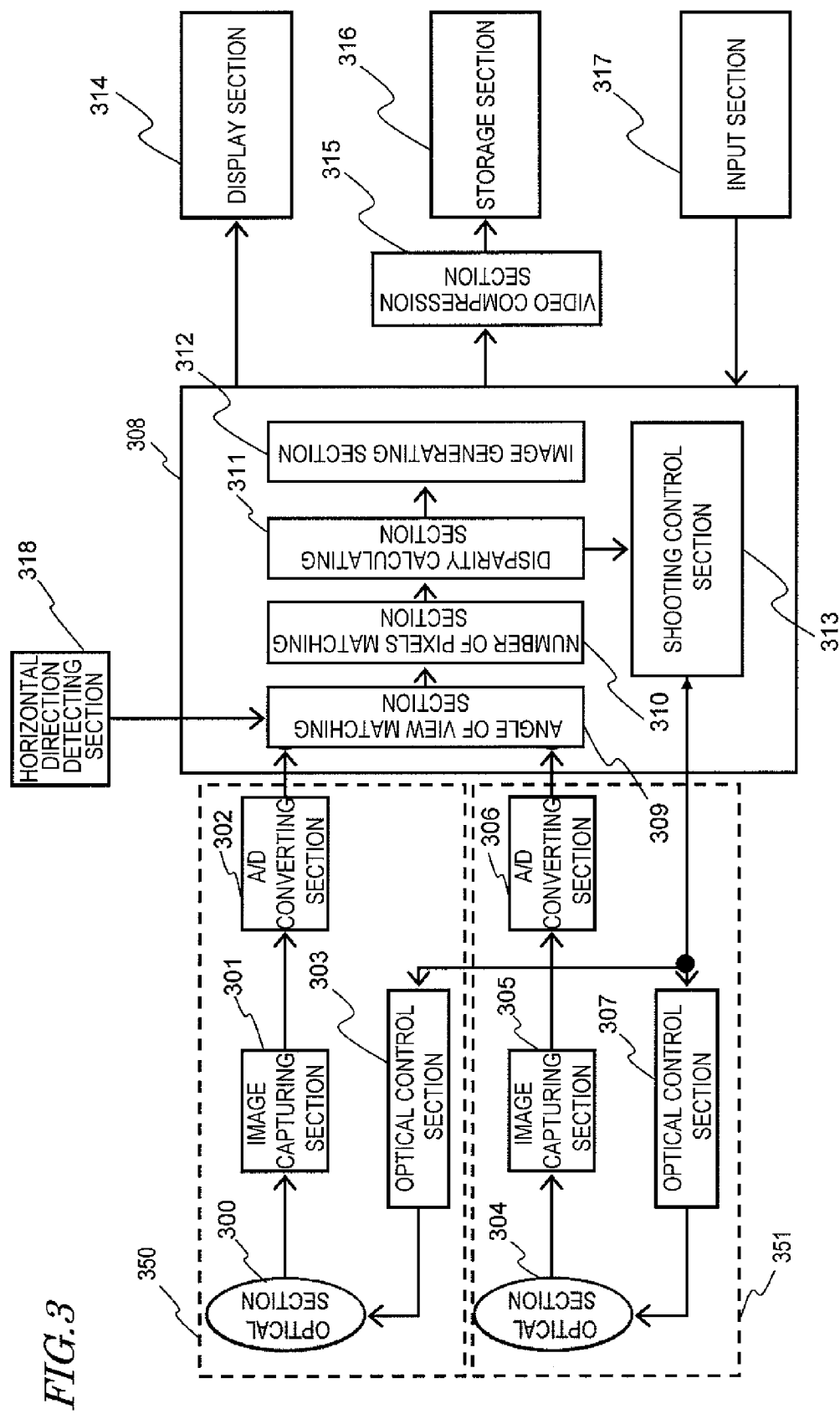
FIG. 3 is a block diagram illustrating a functional configuration for the camcorder of the first embodiment.

FIG. 3 illustrates a functional configuration for the camcorder 101, which includes a first shooting section (main shooting section) 350, a second shooting section (sub-shooting section) 351, an image signal processing section 308, a horizontal direction detecting section 318, a display section 314, a video compressing section 315, a storage section 316, and an input section 317. The main shooting section 350 includes a first optical section 300, an image capturing section 301, an A/D converting section 302 and an optical control section 303. The sub-shooting section 351 includes a second optical section 304, an image capturing section 305, an A/D converting section 306 and an optical control section 307.

The main shooting section 350 corresponds to the main shooting unit 250 shown in FIG. 2. The first optical section 300 corresponds to the first group of lenses 200 shown in. FIG. 2 and adjusts the incoming light that has come from the subject. The first optical section 300 includes optical diaphragm means for controlling the quantity of light entering the image capturing section 301 from the first optical section 300.

The image capturing section 301 corresponds to the CCD 201 shown in FIG. 2 and converts the incoming light that has been incident on the first optical section 300 into an electrical signal.

The A/D converting section 302 corresponds to the A/D converting IC 202 shown in FIG. 2 and converts the analog electrical signal supplied from the image capturing section 301 into a digital signal.

The optical control section 303 corresponds to the actuator 203 shown in FIG. 2 and controls the first optical section 300 under the control of the image signal processing section 308 to be described later.

The sub-shooting section 351 corresponds to the subshooting unit 251 shown in FIG. 2. The second optical section 304, image capturing section 305, A/D converting section 306 and optical control section 307 of the sub-shooting section 351 correspond to the first optical section 300, image capturing section 301, A/D converting section 302 and optical control section 303, respectively. As their functions are the same as their counterparts' in the main shooting section 350, description thereof will be omitted herein. The second optical section 304, image capturing section 305, A/D converting section 306 and optical control section 307 respectively correspond to the second group of lenses 204, CCD 205, A/D converting IC 206 and actuator 207 shown in FIG. 2.

The image signal processing section 308 corresponds to the CPU 208 shown in FIG. 2, receives video signals from the main and sub-shooting sections 350 and 351 as inputs, and generates and outputs a 3D video signal. A specific method by which the image signal processing section 308 generates the video signal will be described later.

The horizontal direction detecting section 318 corresponds to the acceleration sensor 211 shown in FIG. 2 and detects the horizontal direction while video is being shot.

The display section 314 corresponds to the video display function of the display 212 shown in FIG. 2 and displays the 3D video signal that has been generated by the image signal processing section 308. Specifically, the display section 314 displays the right-eye video frame and left-eye video frame, which are included in the 3D video supplied, alternately on the time axis. The viewer wears a pair of video viewing glasses (such as a pair of active shutter glasses) that alternately cuts off the light beams entering his or her left and right eyes synchronously with the display operation being conducted by the display section 314, thereby viewing the left-eye video frame with only his or her left eye and the right-eye video frame with only his or her right eye.

The video compressing section 315 corresponds to the encoder 213 shown in FIG. 2 and encodes the 3D video signal, which has been generated by the image signal processing section 308, in a predetermined format.

The storage section 316 corresponds to the storage device 214 shown in FIG. 2 and stores and retains the 3D video signal that has been encoded by the video compressing section 315. Optionally, the storage section 316 may also store a 3D video signal in any other format, instead of the 3D video signal described above.

The input section 317 corresponds to either the input device 215 shown in FIG. 2 or the touchscreen panel function of the display 212, and accepts an instruction that has been entered from outside of this camcorder.

<3D Video Signal Generation Process>

Next, it will be described how the image signal processing section 308 performs the 3D video signal generation processing. In the following description, the processing to get done by the image signal processing section 308 is supposed to be carried out by the CPU 208 using a software program. However, this is only an embodiment of the present disclosure. Alternatively, the same processing may also be carried out using a piece of hardware such as an FPGA or any other integrated circuit.

As shown in FIG. 3, the image signal processing section 308 includes an angle of view matching section 309, a number of pixels matching section 310, a disparity calculating section 311, an image generating section 312 and a shooting control section 313.

The angle of view matching section 309 matches the angles of view of the video signals that have been supplied from the main and sub-shooting sections 350 and 351. The "angle of view" means the shooting ranges (which are usually represented by angles) of the video that has been shot by the main and sub-shooting sections 350 and 351.

Figure 4:
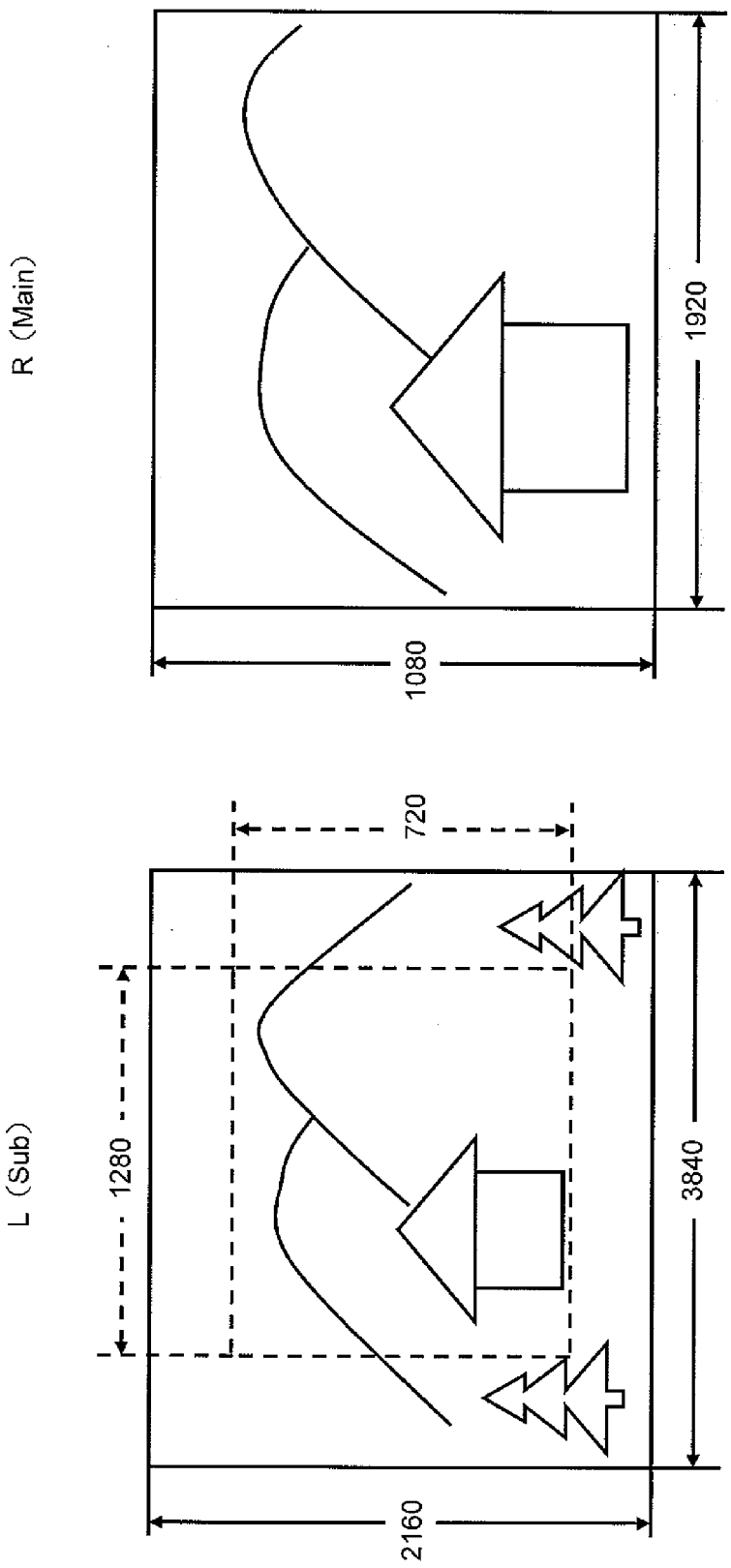
FIG. 4 illustrates what processing is carried out by an angle of view matching section.

FIG. 4 illustrates, side by side, two images that have been generated based on the video signals at a certain point in time, which have been supplied from the main and sub-shooting sections 350 and 351. The video frame supplied from the main shooting section 350 (i.e., the right-eye video frame R) and the video frame supplied from the sub-shooting section 351 (i.e., the left-eye video frame L) have mutually different video zoom powers. This is because the first optical section 300 (corresponding to the first group of lenses 200) has an optical zoom function but the second optical section 304 (corresponding to the second group of lenses 204) has no optical zoom function. Even if the same subject has been shot by the main and sub-shooting sections 350 and 351, the "angles of view" (i.e., the video shooting ranges) of the video actually shot vary according to a difference in zoom power between the first and second optical sections 300 and 304 and their relative positions. Thus, the angle of view matching section 309 performs the processing of matching the video that has been shot from those different angles of view. Since the second optical section 304 of the sub-shooting section 351 has no optical zoom function according to this embodiment, the size of the second optical section 304 (corresponding to the second group of lenses 204) can be reduced.

The angle of view matching section 309 detects what portion of the left-eye video frame that has been captured by the sub-shooting section 351 corresponds to the right-eye video frame that has been captured by the main shooting section 350 and crops that portion. The image signal processing section 308 can not only process the video that has been shot but also learn the state of the first optical section 300 via the optical control section 303. For example, if a zoom control is going to be performed, the image signal processing section 308 gets the zoom function of the first optical section 300 controlled by the shooting control section 313 via the optical control section 303. For that purpose, the image signal processing section 308 can obtain, as additional information, the zoom power of the video that has been shot by the main shooting section 350. Meanwhile, since the second optical section 304 has no zoom function, its zoom power is known in advance. Thus, by reference to these pieces of information, the angle of view matching section 309 can calculate a difference in zoom power between the main and sub-shooting sections 350 and 351 and can locate such a portion of the left-eye video frame corresponding to the right-eye video frame based on that difference in zoom power. In performing this processing, if a range that is approximately 10% larger than the corresponding portion is cropped first and then known pattern matching is carried out within that cropped range, the angles of view can be matched to each other by simple processing. As a method for locating such a portion of the left-eye video frame corresponding to the right-eye video frame, any known method may be adopted.

FIG. 4 shows that the portion of the left-eye video frame inside of the dotted square corresponds to the right-eye video frame. Since the left-eye video frame has been captured by the second optical section 304 that includes a fixed focal length lens with no zoom function, the left-eye video frame covers a wider range (i.e., has a wider angle) than the right-eye video frame that has been shot with the zoom lens zoomed in on the subject. Based on the right-eye video frame and the dotted portion of the left-eye video frame, the angle of view matching section 309 generates video with their angles of view matched to each other.

The number of pixels matching section 310 matches the respective numbers of pixels of the left- and right-eye video frames, of which the angles of view have been matched to each other by the angle of view matching section 309. The respective image capturing sections 301 and 305 used by the main and sub-shooting sections 350 and 351 have mutually different numbers of pixels. Also, if the main shooting section 350 has shot video with the zoom power changed, that portion that has been cropped from the video shot by the sub-shooting section 351 (which will be referred to herein as "sub-video"), of which the angle of view has been matched by the angle of view matching section 309, has its number of pixels increased or decreased according to the zoom power. That is why the left- and right-eye video frames, of which the angles of view have been matched by the angle of view matching section 309, have mutually different numbers of pixels at this point in time, and therefore, not easy to compare to each other. Thus, the number of pixels matching section 310 performs the processing of matching the number of pixels of the video that has been cropped by the angle of view matching section 309. If the luminance signal levels or color signal levels of the left- and right-eye video frames, of which the angles of view have been matched to each other, are significantly different from each other, then the number of pixels matching section 310 may also perform the processing of matching the luminance or color signal levels of the left- and right-eye video frames, too, at the same time.

Also, if the image capturing sections 301 and 305 (corresponding to the CCDs 201 and 205) have too many pixels, then the number of pixels matching section 310 performs the processing of decreasing the number of pixels. For example, if the video that has been shot by the main shooting section 350 had a data size of 1920×1080 pixels, which is large enough to be compatible with the high definition TV standard, then the quantity of the data to handle would be significant. In that case, the overall processing performance required for the camcorder 101 would be so high that it would be more difficult to process the data (e.g., it would take a longer time to process the video that has been shot). That is why the number of pixels matching section 310 not only matches the numbers of pixels but also performs the processing of decreasing the number of pixels if necessary.

For example, the number of pixels matching section 310 decreases the 1920×1080 size of the video that has been shot by the main shooting section 350 to a size of 288×162. In this case, the vertical and horizontal sizes are both multiplied by 3/20.

It should be noted that the number of pixels matching section 310 does not always have to decrease or increase the size of the video as described above but may adopt any known method.

Suppose the image capturing section 305 of the sub-shooting section 351 has a larger number of pixels than the image capturing section 301 of the main shooting section 350. For example, suppose the image capturing section 305 has a resolution of 3840×2160 as shown in FIG. 4 and the portion of the left-eye video frame that has been cropped by the angle of view matching section 309 has a size of 1280×720. In that case, the number of pixels matching section 310 multiplies the cropped portion of the video frame with the size of 1280×720 by 9/40 both vertically and horizontally alike. As a result, the left-eye video frame also comes to have a size of 288×162.

Figure 5:
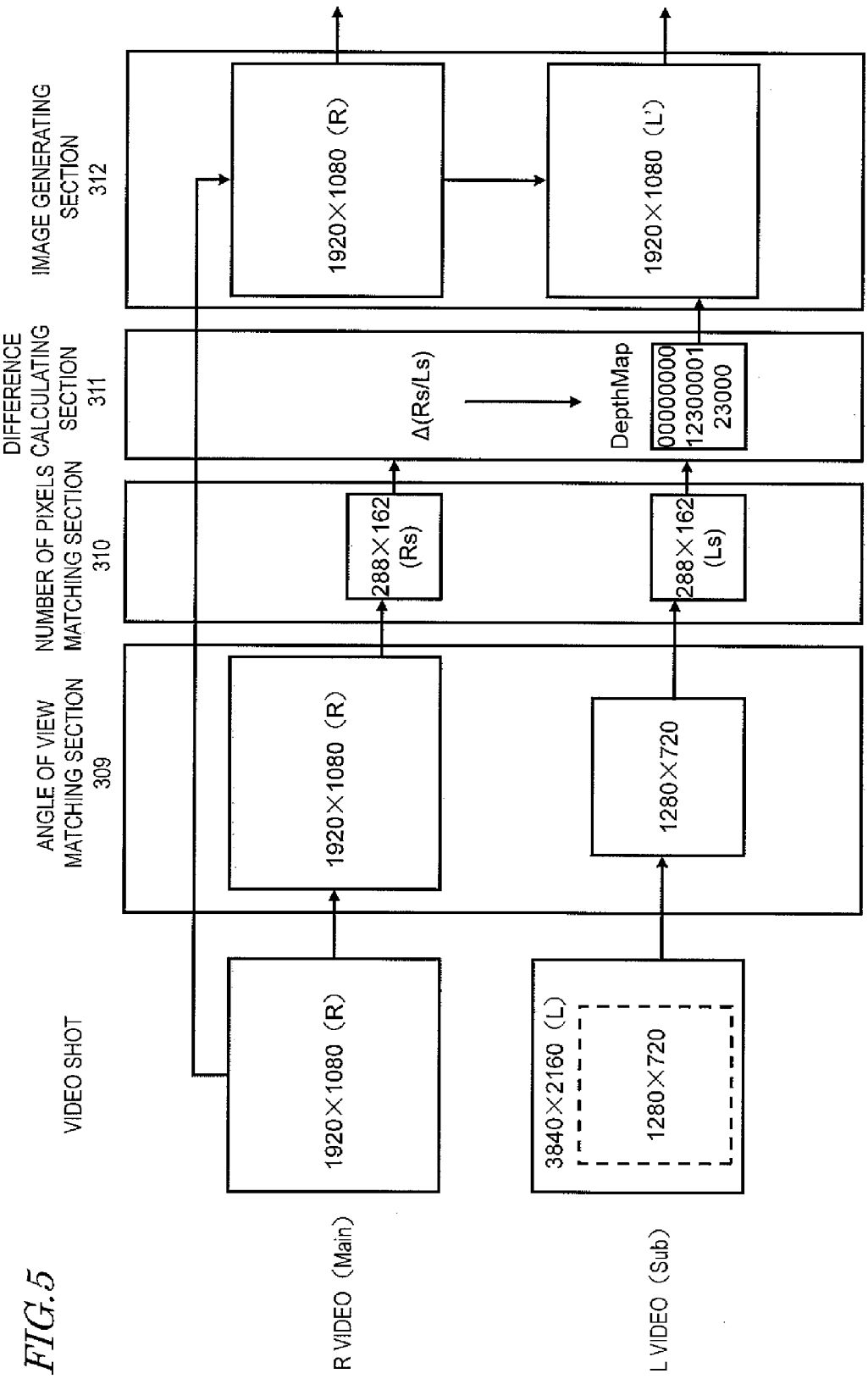
FIG. 5 shows how the data processed by an image signal processing section varies.

FIG. 5 shows how the result of the video data processing performed by the angle of view matching section 309 and the number of pixels matching section 310 varies. In FIG. 5, also shown are the results of processing performed by the disparity calculating section 311 and the image generating section 312 to be described later. As described above, having matched the angles of view of the right-eye video frame (R) and left-eye video frame (L) to each other, the angle of view matching section 309 crops a portion of the left-eye video frame (i.e., video with a size of 1280×720) corresponding to the right-eye video frame. Meanwhile, the number of pixels matching section 310 not only matches the respective numbers of pixels of the left- and right-eye video frames, of which the angles of view have been matched to each other, but also decreases the sizes of the video frames to an appropriate size for the processing to be carried out later (i.e., video Rs and Ls with a size of 288×162).

The disparity calculating section 311 detects and calculates the parallax between the left-and right-eye video frames, which have been subjected to the angle of view matching processing by the angle of view matching section 309 and the number of pixels matching processing by the number of pixels matching section 310. Even if the same subject has been shot, the video frame obtained by the main shooting section 350 and the video frame obtained by the sub-shooting section 351 become different from each other by the magnitude of the parallax. For example, if the two video frames shown in FIG. 6 have been obtained, the position of the building 600 that has been shot as a subject in the left-eye video frame L is different from in the right-eye video frame R. The right-eye video frame R has been captured by the main shooting section 350 from the right-hand side compared to the left-eye video frame L that has been captured by the sub-shooting section 351. That is why in the right-eye video frame R, the building 600 is located closer to the left edge than in the left-eye video frame L. Stated otherwise, in the left-eye video frame L, the building 600 is located closer to the right edge than in the right-eye video frame R. The disparity calculating section 311 calculates the parallax of the subject image based on these two different video frames.

Figure 7:
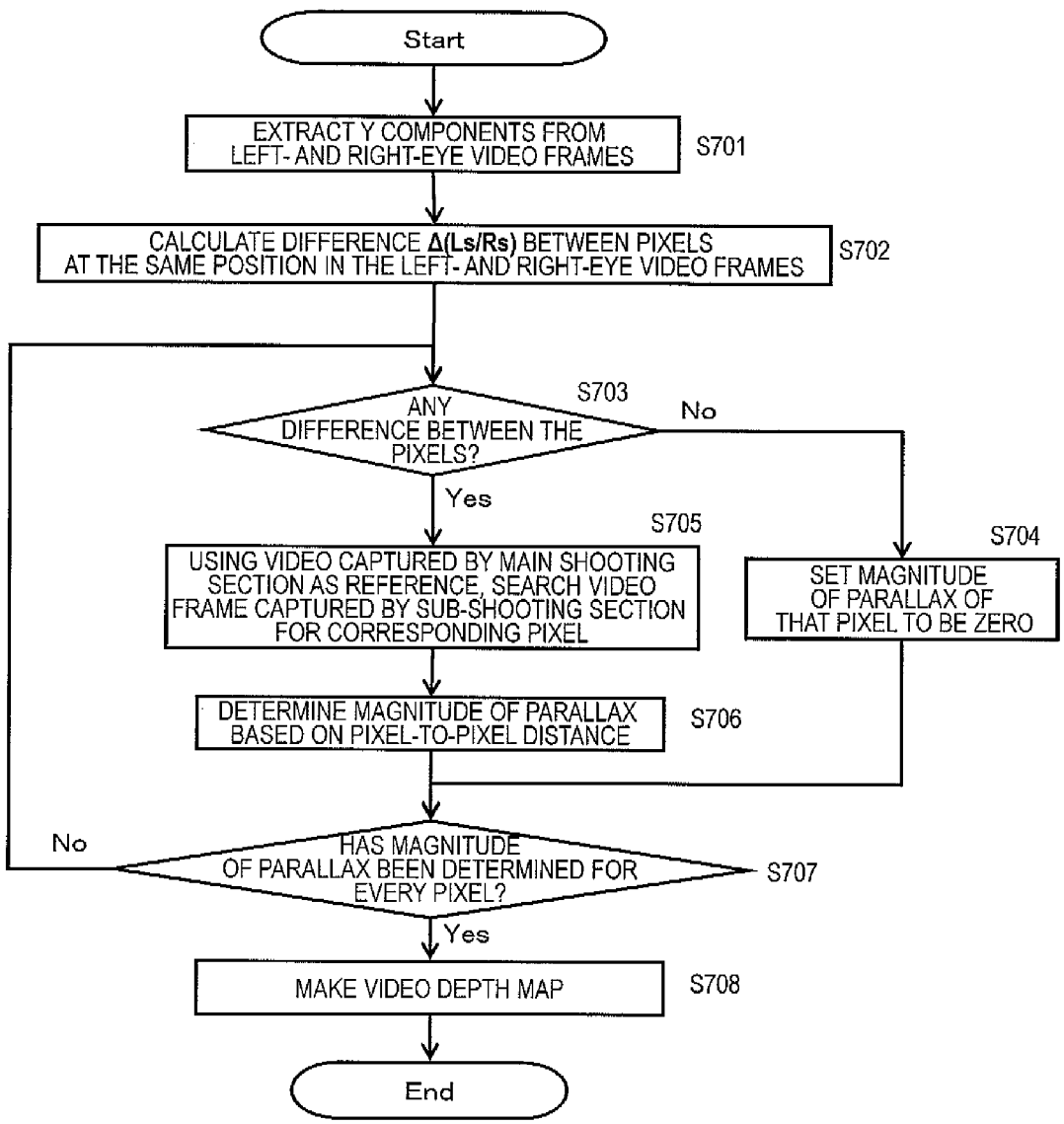
FIG. 7 is a flowchart showing the procedure of the processing of calculating the parallax between the left- and right-eye video frames.

FIG. 7 is a flowchart showing the procedure of the processing to be carried out by the disparity calculating section 311, which calculates the parallax between the left- and right-eye video frames following the procedure shown in FIG. 7. Hereinafter, the respective processing steps shown in FIG. 7 will be described.

First of all, in Step S701, the disparity calculating section 311 generates video frames by extracting only the luminance signals (Y signals) from the left- and right-eye video frames that have been provided. The reason is that in detecting parallax, it will be more efficient, and will lighten the processing load, to process only the Y signal (luminance signal) among YCbCr (representing the luminance and the color difference) rather than performing processing in all of the three primary colors of RGB. Although video is supposed to be represented by the luminance signal Y and the color difference signals CbCr according to this embodiment, video may also be represented and processed in the three primary colors of RGB.

Next, in Step S702, the disparity calculating section 311 calculates the difference Δ(Ls/Rs) between the left- and right-eye video frames based on the luminance signals of the left- and right-eye video frames that have been generated in the previous processing step S701. In this processing step, the disparity calculating section 311 calculates the difference by comparing pixels that are located at the same position in the two video frames. For example, if the luminance signal at a certain pixel location in the left-eye video frame has a (pixel) value Ls of 103 and if the luminance signal at the corresponding pixel location in the right-eye video frame has a value Rs of 101, then the difference Δ(Ls/Rs) at that pixel becomes equal to two.

Subsequently, in Step S703, the disparity calculating section 311 changes the modes of processing in the following manner on a pixel-by-pixel basis according to the differential value between the pixels that has been calculated in the previous processing step S702. If the differential value is equal to zero (i.e., if the left- and right-eye video frames have quite the same pixel value), then the processing step S704 is performed. On the other hand, if the differential value is not equal to zero (i.e., if the left- and right-eye video frames have different pixel values), then the processing step S705 is performed.

If it has turned out in the processing step S703 that the left- and right-eye video frames have quite the same pixel value, then the disparity calculating section 311 sets the amount of parallax of that pixel to be zero in the processing step S704. It should be noted that although the amount of parallax is supposed to be zero just for illustrative purposes if the left- and right-eye video frames have quite the same pixel value, calculation is not always made in this way in actual products. For example, even if the left- and right-eye video frames do not have quite the same pixel value but if the set of pixels surrounding that pixel has quite the same set of values in both of the left- and right-eye video frames and if the difference between those pixel values is small, then those pixels may also be determined to be the same between the left- and right-eye video frames. That is to say, the amount of parallax may be determined with not only the difference in the value of a pixel of interest between the left- and right-eye video frames but also the difference in the values of surrounding pixels between those frames taken into account. Then, the influence of calculation errors to be caused by an edge or a texture near that pixel can be eliminated. Also, even if the pair of pixels of interest or the two sets of surrounding pixels do not have quite the same pixel value(s) but if the difference between the values of those pixels of interest is less than a predetermined threshold value, then the amount of parallax may be determined to be zero.

On sensing a difference between those two video frames, the disparity calculating section 311 uses the video frame that has been captured by the main shooting section 350 (e.g., the right-eye video frame in this embodiment) as a reference video frame, and searches the video frame that has been captured by the sub-shooting section 351 (e.g., the left-eye video frame in this embodiment) for a pixel corresponding to a particular pixel in the reference video frame in Step S705. The corresponding pixel may be searched for by calculating differences while changing the targets pixel by pixel both horizontally and vertically starting from a pixel of interest in the left-eye video frame and by finding a pixel, of which the difference calculated has turned out to be minimum. Alternatively, since a line and one of its neighboring lines have similar luminance signal patterns, the most likely corresponding pixel may be searched for by reference to information about those patterns. Also, if there is any point at infinity in a video frame, no parallax should be produced at that point, and therefore, the corresponding pixel may be searched for with that point at infinity used as reference point. Furthermore, not just the luminance signals but also similarity in pattern between color signals may be taken into consideration as well. It can be determined, by performing an autofocus operation, for example, where on the video frame that point at infinity is located. It should be noted that if video has been shot with the camcorder 101 held at a totally horizontal position, then parallax will be produced only horizontally, and therefore, it can be said that the pixel-by-pixel search between the left- and right-eye video frames may be done only horizontally on that video frame. If video is shot by the paralleling technique, an object at the point at infinity will have a parallax of zero and objects located closer than the object at the point at infinity will have parallax only horizontally. That is why the search may be performed only in the horizontal direction.

Next, in Step S706, the disparity calculating section 311 calculates the pixel-to-pixel distance on the video screen between the corresponding pixel that has been located by searching the left-eye video frame and the pixel in the reference video frame. The pixel-to-pixel distance is calculated based on those pixel locations and may be expressed by the number of pixels. Based on the result of this calculation, the amount of parallax is determined. The longer the pixel-to-pixel distance, the greater the amount of parallax should be. Stated otherwise, the shorter the pixel-to-pixel distance, the smaller the amount of parallax should be.

As for the video frames captured by the main and sub-shooting sections 350 and 351, the shorter the distance from the camcorder 101 to the subject that has been shot (i.e., the shorter the shooting distance), the greater the amount of parallax on the video screen tends to be. In other words, the longer the distance from the camcorder 101 to the subject, the smaller the amount of parallax on the video screen tends to be. This tendency will be described in further detail. If the main and sub-shooting sections 350 and 351 are configured to shoot the subject by a so-called "crossing method", their optical axes will intersect with each other at a point (which will be referred to herein as a "cross point"). If the subject is located closer to the camcorder 101 than the cross point as a reference point is, the closer to the camcorder 101 the subject is, the greater the amount of parallax. Conversely, if the subject is located more distant from the camcorder 101 than the cross point is, the more distant from the camcorder 101 the subject is, the larger the amount of parallax tends to be.

Thereafter, if the disparity calculating section 311 has decided in Step S707 that the amount of parallax has been determined for every pixel, the process advances to the next processing step S708. On the other hand, if there are any pixels for which the amount of parallax has not been determined yet, then the process goes back to the processing step S703 to perform the same series of processing steps all over again on those pixels, of which the amounts of parallax are to be determined.

If the amount of parallax has been determined for every pixel, the amount of parallax has already been determined over the entire video screen. That is why the disparity calculating section 311 compiles information about the amounts of parallax over the entire video screen as a depth map in Step S708. This depth map provides information about the depth of the subject on the video screen or each portion of the video screen. In the depth map, a portion, of which the amount of parallax is small, has a value close to zero. And the greater the amount of parallax of a portion, the larger the value of that portion. There is a one-to-one relation between the amount of parallax and the depth information provided by the depth map. That is why given some geometric shooting condition such as the angle of convergence or the stereo base distance, mutual conversion can be readily made between them. Consequently, 3D video can be represented by either the image shot by the main shooting section 350 (i.e., the main image) and the amount of parallax between the left- and right-eye video frames or the main image and the depth map.

Figure 9:
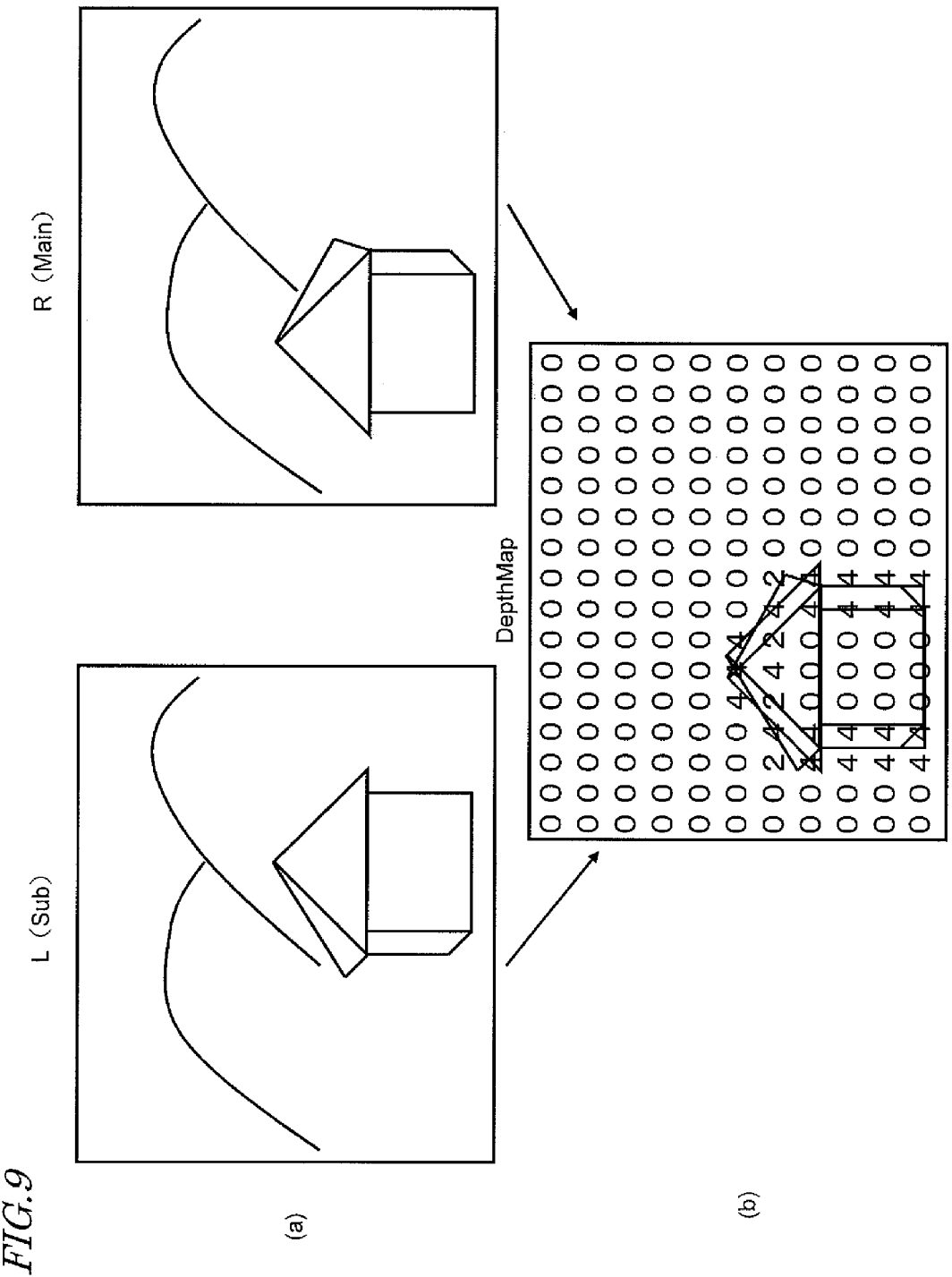
FIG. 9 shows an example set of data representing the amount of parallax calculated.

FIG. 9 shows an example of a depth map to be generated when the video frames shown in FIG. 6 are captured. As shown in portion (b) of FIG. 9, a portion with parallax has a value, which varies according to the amount of parallax, while a portion with no parallax has a value of zero. In the example illustrated in portion (b) of FIG. 9, the amounts of parallax are represented more coarsely than reality. Actually, however, the amount of parallax is calculated on a pixel-by-pixel basis.

In generating a depth map based on the amount of parallax, it is recommended that the lens-to-lens distance between the first and second optical sections 300 and 304 and their relative positions be taken into consideration. The relative positions of the first and second optical sections 300 and 304 ideally correspond to those of a person's right and left eyes. But it is not always possible to arrange the first and second optical sections 300 and 304 at such positions. In that case, the disparity calculating section 311 may generate a depth map with the relative positions of the first and second optical sections 300 and 304 taken into account. For example, if the first and second optical sections 300 and 304 are arranged close to each other, the amounts of parallax calculated may be increased when a depth map is going to be generated. If the first and second optical sections 300 and 304 are arranged too close to each other, the difference in parallax between the video frames to be captured may be too small to get natural 3D video even when such video frames are synthesized as they are. That is why the disparity calculating section 311 may generate a depth map with the relative positions of the first and second optical sections 300 and 304 taken into consideration.

Figure 10:
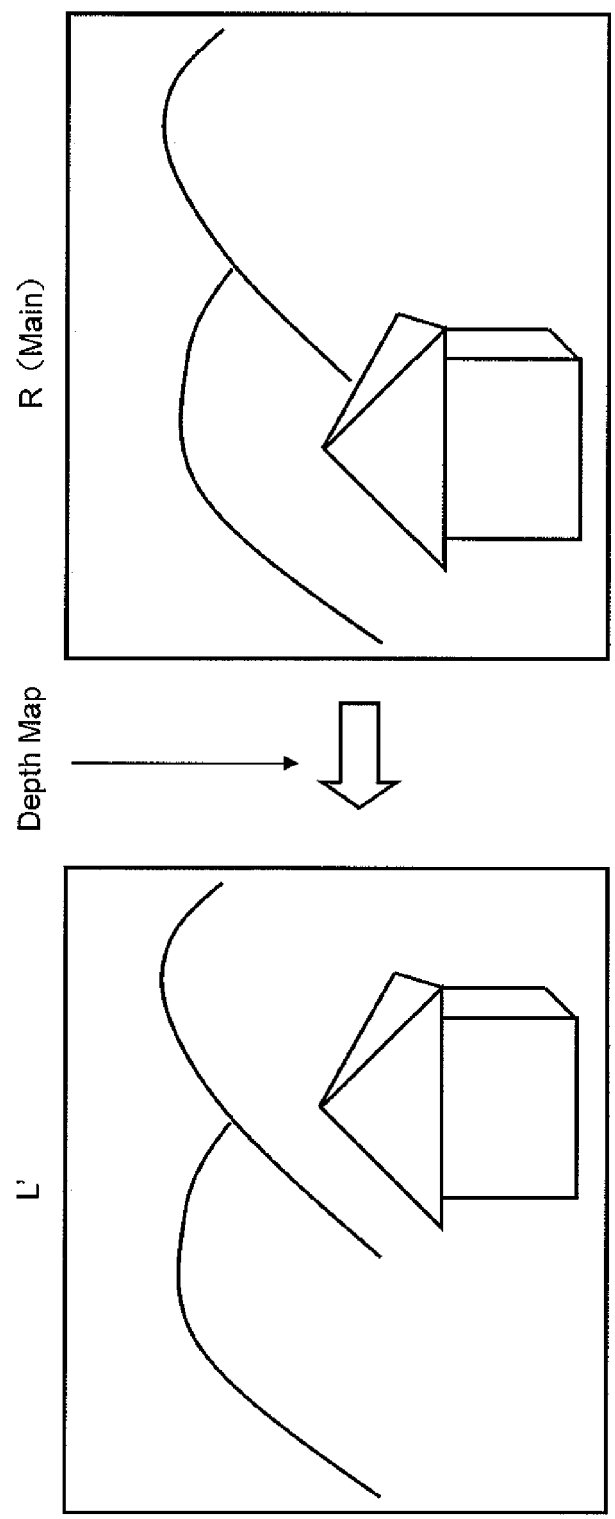
FIG. 10 shows that a pair of video frames that will form 3D video has been generated based on a video frame captured by the main shooting section.

By reference to the depth map (i.e., the amount of parallax on a pixel basis) that has been calculated by the disparity calculating section 311, the image generating section 312 generates a video frame to be one of the two video frames that form 3D video based on the video frame that has been captured by the main shooting section 350. In this embodiment, the image generating section 312 generates a left-eye video frame L' based on the right-eye video frame R and the depth map as shown in FIG. 10. In that case, first of all, by reference to the depth map, the image generating section 312 determines where on the video screen parallax has been produced in the right-eye video frame R with a size of 1920×1080 pixels that has been supplied from the main shooting section 350. Next, the image generating section 312 performs the processing of correcting that portion with parallax, thereby generating a video frame with appropriate parallax as the left-eye video frame. In other words, the image generating section 312 performs the processing of shifting that portion with parallax in the right-eye video frame R to the right according to the amount of parallax indicated by the depth map so that the video frame generated can be used appropriately as the left-eye video frame, and outputs the video frame thus generated as the left-eye video frame L'. That portion with parallax is shifted to the right because a portion of the left-eye video frame with parallax is located closer to the right edge than its corresponding portion of the right-eye video frame is.

As shown in FIG. 5, the image generating section 312 outputs the left-eye video frame L' thus generated and the right-eye video frame R that was supplied to the image signal processing section 308 as a 3D video signal as shown in FIG. 5. As a result, the image signal processing section 308 can output a 3D video signal based on the video signals that have been obtained by the main shooting section 350 and the sub-shooting section 351.

By performing these processing steps, even if the main and sub-shooting sections 350 and 351 have different configurations, the camcorder 101 can also use one video frame captured to generate the other of two video frames that form 3D video.

Hereinafter, the procedure of the overall processing to be carried out by this camcorder 101, including the angle of view matching section 309, the number of pixels matching section 310, the disparity calculating section 311 and the image generating section 312, will be described with reference to the flowchart shown in FIG. 8.

First, in Step S801, the image signal processing section 308 accepts the shooting mode that has been entered through the input section 317. The shooting mode may be chosen by the user from a 3D video shooting mode and a non-3D (i.e., 2D) video shooting mode.

Next, in Step S802, the image signal processing section 308 determines whether or not the shooting mode entered is the 3D shooting mode or the non-3D shooting mode.

If the shooting mode entered turns out to be the non-3D shooting mode, the image signal processing section 308 gets and stores, in Step S803, the video that has been shot by the main shooting section 350 as in an ordinary camcorder.

On the other hand, if the shooting mode entered turns out to be the 3D video shooting mode, the image signal processing section 308 gets a main video frame and a sub-video frame shot by the main and sub-shooting sections 350 and 351, respectively, in Step S804.

Subsequently, in Step S805, the angle of view matching section 309 performs angle of view matching processing on the main and sub-video frames supplied by the method described above.

Thereafter, in Step S806, the number of pixels matching section 310 performs number of pixels matching processing as described above on the main and sub-video frames that have been subjected to the angle of view matching processing.

Then, in Step S807, the disparity calculating section 311 detects the amounts of parallax of the main and sub-video frames that have been subjected to the number of pixels matching processing. The amounts of parallax may be detected following the procedure of the processing that has already been described with reference to FIG. 7.

Next, in Step S808, the image generating section 312 uses the main video frame and the amount of parallax calculated to generate a sub-video frame, which forms, along with the main video frame, a pair of video frames to be video, as described above.

Subsequently, in Step S809, the camcorder 101 displays the 3D video generated on the display section 314. Although the video generated is supposed to be displayed in this example, the video generated may also be stored instead of being displayed.

Finally, in Step S810, the camcorder 101 determines whether or not video can be shot continuously. If shooting may be continued, the process goes back to the processing step S804 to perform the same series of processing steps all over again. On the other hand, if shooting may not be continued, the camcorder 101 ends the shooting session.

3D video is not necessarily generated based on the video frames captured as described above. Alternatively, contour matching may also be used. This is a method for filling the texture and generating a high definition image by matching the contour of the finer one of left and right image channels to that of the other coarser image channel. As is introduced in the field of computer graphics (CG), by mapping a texture to the surface of a 3D model (or 3D object), which is represented by a polygon with vertices, edge lines, and plane connection information (phase information) (i.e., attaching the texture to the surface just like a piece of wall paper), a high-definition image can be generated. In that case, the texture of an occlusion portion (i.e., a hidden portion) may be estimated from the texture of its surrounding portions and filled. In this description, the "occlusion portion" refers to a portion that is shown in one video frame but that is not shown in the other video frame (i.e., an information missing region). By extending a non-occlusion portion, the occlusion portion may be hidden behind the non-occlusion portion.

The non-occlusion portion may be extended by a known method that uses a smoothing filter such as a Gaussian filter. A video frame with such an occlusion portion can be corrected by replacing a depth map with a relatively low resolution with a new depth map that has been obtained through a smoothing filter with predetermined attenuation characteristic. By adopting such a method, natural 3D video can also be generated even in the occlusion portion.

Still alternatively, a 2D-3D conversion may also be used. For example, by comparing a high-definition right-channel image (which will be referred to herein as either "R-ch image" or an "estimated image"), which is generated by subjecting a high-definition left-channel image (which will be referred to herein as either "L-ch image") to the 2D-3D conversion, to the right-channel image (R-ch image) that has been shot actually, a high-definition image with no contour errors can be generated.

Yet alternatively, the following method may also be adopted. First of all, based on the image features of a high definition L-ch image (which may be made up of 1920 horizontal pixels×1080 vertical pixels) including composition, contour, colors, texture, sharpness and spatial frequency distribution, the disparity calculating section 311 estimates and generates a piece of depth information (which will be referred to herein as "Depth Information #1"). In this case, the resolution of Depth Information #1 may be set to be approximately equal to or lower than that of the L-ch image, and may be defined by 288 horizontal pixels×162 vertical pixels, for example. Next, based on the L-ch and R-ch images that have been actually captured through the two lens systems (and that may be made up of 288 horizontal pixels×162 vertical pixels), the disparity calculating section 311 generates another piece of depth information (which will be referred to herein as "Depth Information #2"). In this case, the resolution of Depth Information #2 may be set to be approximately equal to or lower than that of the R-ch image, and may be defined by 288 horizontal pixels×162 vertical pixels, for example.

It should be noted that the Depth Information #2 has been calculated based on the actually captured images, and therefore, is more accurate than the Depth Information #1 that has been estimated and generated based on the image features. That is why estimation errors of the Depth Information #1 can be corrected by reference to the Depth Information #2. That is to say, in this case, it is equivalent to using the Depth Information #2 as a constraint condition for increasing the accuracy of the Depth Information #1 that has been generated through the 2D-3D conversion by image analysis.

This method also works fine even when the optical zoom is used on L-ch. If the optical zoom is activated on L-ch, it would be more resistant to occurrence of image distortion to use the image information of the high-definition L-ch as reference image and refer to the image information of R-ch as sub-image for the following reasons. Firstly, stereo matching processing can get done more easily between the L-ch image and the R-ch image by varying the zoom power subtly. Secondly, if while the optical zoom power is varying continuously on L-ch, the electronic zoom power is changed accordingly on R-ch to calculate the depth information, then it will take a lot of time to get calculations done and image distortion (errors) tends to occur during the stereo matching process.

It is said that as far as a human being is concerned, it should be his or her brain to create a fine 3D shape or 3D representation based on stereoscopic video that has struck his or her eyes. That is why if the depth is expressed by adding the spherical parallax of the eye bulbs to the entire video as a sort of 2D-3D conversion or by referring to information about the zoom power or the focus length during shooting, subject's depth information can also be estimated based on how much the subject image is blurred.

According to yet another method, by making geometric calculations on the L-ch image by reference to the depth information that has been actually obtained through the two lens systems, the L-ch image may be converted into parallax information. And by making geometric calculations using that parallax information, an R-ch image can be calculated based on the L-ch image.

Yet another method is a super-resolution method. According to this method, when a high-definition R-ch image is going to be generated based on a coarse R-ch image by the super-resolution method, a high-definition L-ch image is referred to. For example, a depth map that has been smoothed out by a Gaussian filter, for example, may be converted into parallax information based on the geometric arrangement of the image capturing section and a high-definition R-ch image can be calculated based on the high-definition L-ch image by reference to that parallax information.

<Video Shooting by Reference to Parallax Information>

Next, it will be described how the shooting control section 313 of the image signal processing section 308 (see FIG. 3) operates. The shooting control section 313 controls the shooting condition on the main and sub-shooting sections 350 and 351 in accordance with the parallax information that has been calculated by the disparity calculating section 311.

The left- and right-eye video frames that form the 3D video to be generated by the camcorder 101 of this embodiment are generated based on the video frame that has been captured by the main shooting section 350 and used. On the other hand, the video frame that has been captured by the sub-shooting section 351 is used to detect parallax information with respect to the video frame that has been captured by the main shooting section 350. That is why it is recommended that the sub-shooting section 351 shoot video, from which parallax information can be obtained easily, in cooperation with the main shooting section 350.

Thus, the shooting control section 313 controls the main and sub-shooting sections 350 and 351 in accordance with the parallax information that has been calculated by the disparity calculating section 311. For example, the shooting control section 313 may control their exposure, white balance and autofocus.

If the disparity calculating section 311 cannot detect the parallax properly from the video frames that have been captured by the main and sub-shooting sections 350 and 351, this could be partly because the main and sub-shooting sections 350 and 351 have different shooting conditions. That is why by controlling the optical control section(s) 303 and/or 307 based on the parallax detection result obtained by the disparity calculating section 311, the shooting control section 313 changes the shooting conditions on the main and/or sub-shooting section(s) 350, 351.

For example, if the main shooting section 350 has shot video with proper exposure but if the sub-shooting section 351 has shot video with excessive exposure, then the video frame captured by the sub-shooting section 351. becomes generally whitish video (i.e., the pixel values of the image data captured become close to their upper limit) and the subject's contour sometimes cannot be recognized. And if the disparity calculating section 311 performs its processing based on such video, the subject's contour could not be cropped from the video that has been shot by the sub-shooting section 351. That is why the shooting control section 313 gets the exposure of the sub-shooting section 351 corrected by the optical control section 307 in that case. The exposure may be corrected by adjusting the diaphragm (not shown), for example. As a result, the disparity calculating section 311 can detect the parallax based on the video that has shot by the sub-shooting section 351 and then corrected.

In another example, the control operation may also be carried out in the following manner, too. Even if the same subject is covered by the video frames that have been captured by the main and sub-shooting sections 350 and 351, the subject sometimes has different focuses. In that case, by comparing those two video frames to each other, the disparity calculating section 311 can sense that the subject's contour has different definitions between those two video frames. On sensing such a difference in the definition of the same subject's contour between those two video frames, the shooting control section 313 instructs the optical control sections 303 and 307 to adjust the focuses of the main and sub-shooting sections 350 and 351. Specifically, the shooting control section 313 performs a control operation so that the focus of the sub-shooting section 351 is adjusted to that of the main shooting section 350.

As described above, in accordance with the parallax information that has been calculated by the disparity calculating section 311, the shooting control section 313 controls the shooting conditions on the main and sub-shooting sections 350 and 351. As a result, the disparity calculating section 311 can extract the parallax information more easily from the video frames that have been captured by the main and sub-shooting sections 350 and 351.

<3D Video Generation by Reference to Horizontal Direction Information>

Next, it will be described what processing the angle of view matching section 309 will perform if a shooting session has been carried out with the camcorder 101 tilting with respect to the horizontal plane. The angle of view matching section 309 gets information about the horizontal direction of the camcorder 101 from the horizontal direction detecting section 318. Generally speaking, the left- and right-eye video frames included in 3D video do have parallax horizontally but have no parallax vertically. This is because a person's left and right eyes have a predetermined gap left between them horizontally but are located on substantially the same level vertically. That is why a human being generally has a relatively high degree of sensitivity due to a horizontal retinal image difference even in a sense cell such as the retina. For example, a human can sense a depth of approximately 0.5 mm at a viewing angle of a few seconds or in a visual range of 1 m. Even though the human sensitivity is high with respect to the horizontal parallax, his or her sensitivity to vertical parallax should be generally low because the vertical parallax depends on a particular space sensing pattern due to the vertical retinal image difference. In view of this consideration, it is recommended that as for the 3D video to be shot and generated, parallax be produced only horizontally, not vertically.

However, aside from a situation where a shooting session is performed with the camcorder 101 fixed on a tripod, if the user is shooting video holding the camcorder 101 in his or her hand, the video shot is not always level with the ground.

Figure 11:
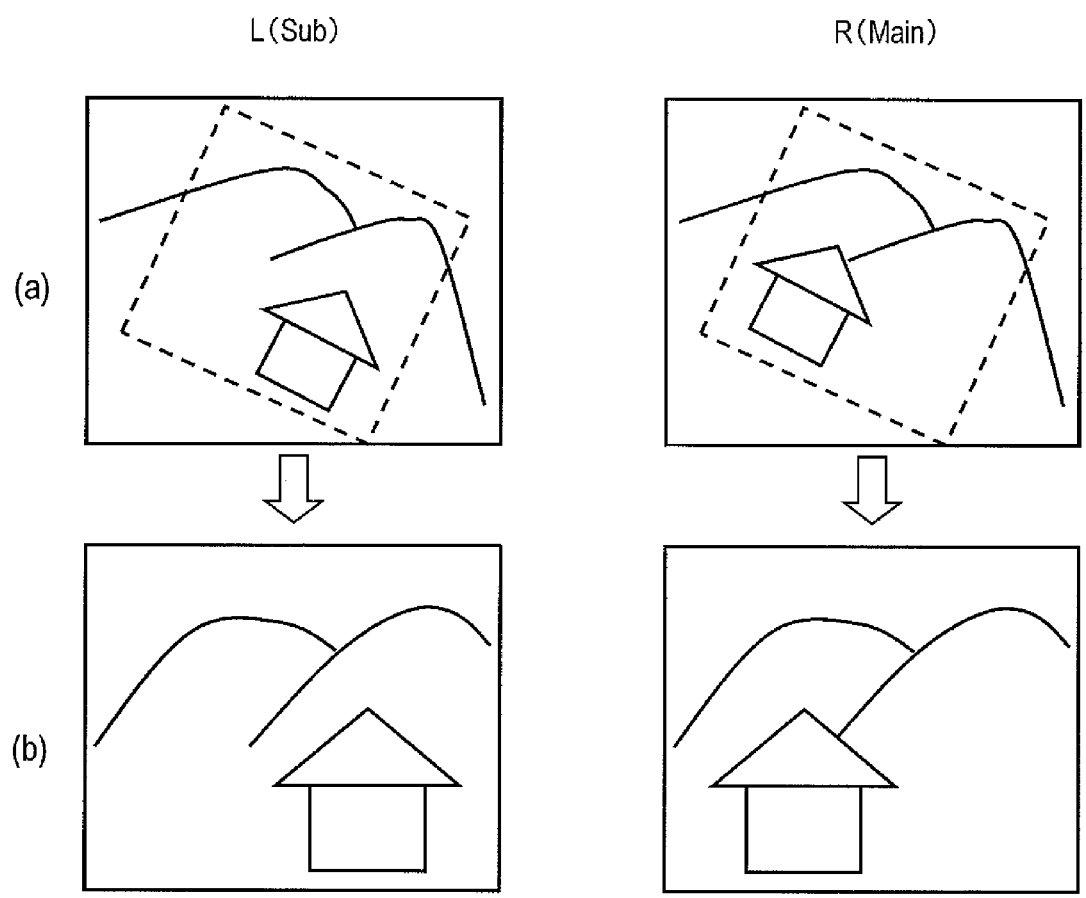
FIG. 11 illustrates an exemplary situation where the angle of view matching section has performed degree of horizontal parallelism adjustment processing.

That is why the horizontal direction detecting section 318 gets information about the status of the camcorder 101 while shooting video (e.g., information about its tilt with respect to the horizontal direction, in particular). In matching the angles of view of the left- and right-eye video frames to each other, the angle of view matching section 309 adjusts the degree of horizontal parallelism of the video by reference to the tilt information provided by the horizontal direction detecting section 318. Suppose the camcorder 101 is tilted while shooting video, and makes the video shot also tilted as shown in portion (a) of FIG. 11. In that case, the angle of view matching section 309 not only matches the angles of view of the video frames that have been captured by the main and sub-shooting sections 350 and 351 but also adjusts the degrees of horizontal parallelism of those two video frames. Specifically, in accordance with the tilt information provided by the horizontal direction detecting section 318, the angle of view matching section 309 changes the horizontal direction in matching the angles of view and outputs the dotted range shown in portion (a) of FIG. 11 as a result of the angle of view matching. Portion (b) of FIG. 11 shows the output video, of which the degrees of horizontal parallelism have been adjusted by the angle of view matching section 309.

With the degrees of horizontal parallelism adjusted by the angle of view matching section 309, even if video has been shot by the camcorder 101 tilting, the degrees of horizontal parallelism are adjusted properly while 3D video is being generated. That is why in the 3D video thus generated, parallax is produced mostly horizontally and hardly produced vertically. As a result, the viewer can view natural video.

In the example described above, the angle of view matching section 309 is supposed to sense the shooting status of the camcorder 101 by reference to the tilt information provided by the horizontal direction detecting section 318. However, this is just an example of the present disclosure. Alternatively, the image signal processing section 308 may also detect horizontal and vertical components of the video by any other method even without using the horizontal direction detecting section 318.

Figure 12:
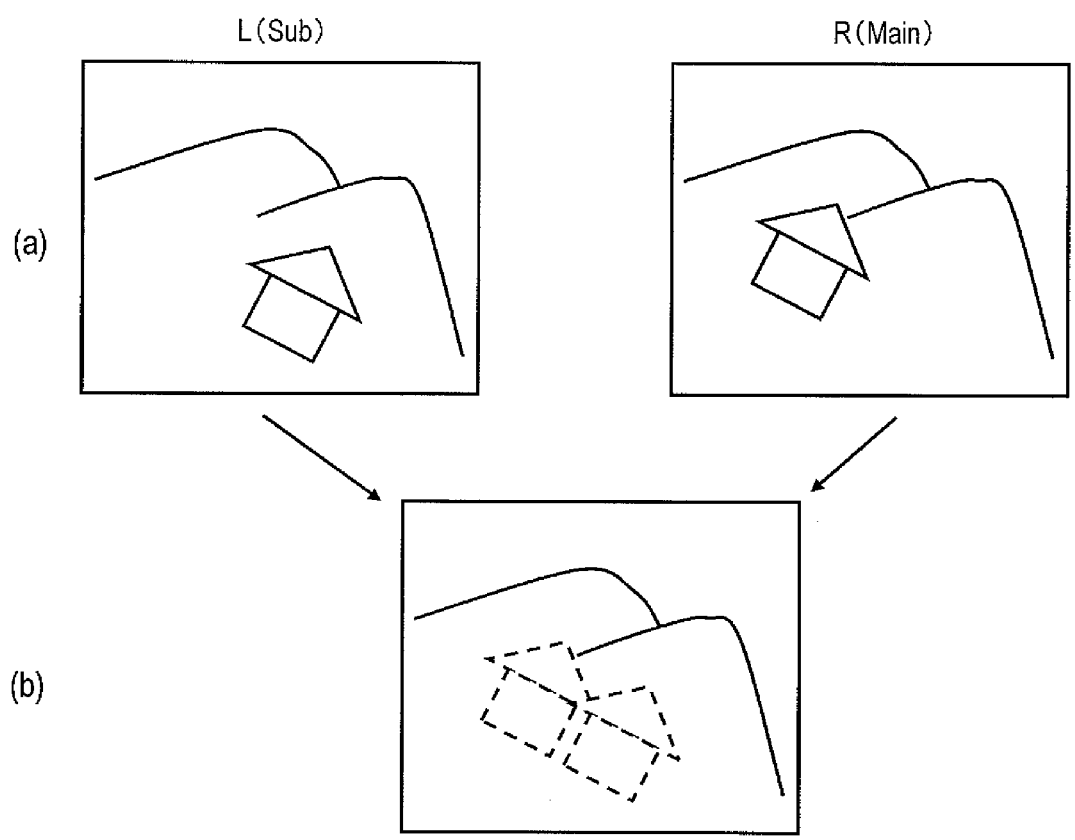
FIG. 12 illustrates an exemplary situation where the disparity calculating section has performed the degree of horizontal parallelism adjustment processing.

For example, the disparity calculating section 311 generates parallax information based on the two video frames that have been supplied from the main and sub-shooting sections 350 and 351. By reference to this parallax information, the disparity calculating section 311 may also determine the degree of horizontal parallelism. If the video frames R and L shown in portion (a) of FIG. 12 have been captured by the main and sub-shooting sections 350 and 351, respectively, then the parallax information generated by the disparity calculating section 311 may be represented by the video frame shown in portion (b) of FIG. 12, for example. In the video frame shown in FIG. 12, a portion with no parallax is drawn in solid lines and a portion with parallax is drawn in dotted lines in accordance with the parallax information. As can be seen from FIG. 12, the portion with parallax is a focused portion of the video shot, while the portion with no parallax is a subject that is located more distant from the focused subject. The more distant subject represents the background of the video. By analyzing these portions of the video, the horizontal direction can be detected. For instance, in the example illustrated in FIG. 12, by analyzing logically the background "mountain" portion, the horizontal direction can be determined. More specifically, by detecting the shape of the mountain, the growing state of the trees on the mountain and so on, the vertical and horizontal directions can be determined.

By performing these processing steps, the angle of view matching section 309 and the disparity calculating section 311 can detect the tilt of the video frames that have been captured while 3D video is being generated, and can generate 3D video with, the degree of horizontal parallelism adjusted. That is why even if video has been shot by the camcorder 101 tilting, the viewer can also view 3D video, of which the degree of horizontal parallelism falls within a predetermined range.

<Determining Whether 3D Video Needs to be Generated or Not>

As described above, the camcorder 101 generates video based on the video frames that have been captured by the main and sub-shooting sections 350 and 351. However, the camcorder 101 does not always have to generate 3D video. Generally speaking, by making the viewer sense a difference in the depth of the subject by using the parallax between the left- and right-eye video frames, 3D video gives the viewer a stereoscopic impression. That is why to generate such 3D video, there needs to be some difference in depth (e.g., a difference in the amount of parallax) between the subject images included in the video frames displayed. Also, if multiple subjects are arranged uniformly from the vicinity of the camcorder 101 through a distance, 3D video that would look even more stereoscopic can be obtained.

The cameras disclosed in Patent Documents Nos. 1 and 2 are configured to always shoot 3D video. That is why even a scene that would not give such a stereoscopic impression when shot is also turned into 3D video. To overcome such a problem, the camcorder 101 of this embodiment is configured to change the modes of shooting from 3D video shooting into ordinary 2D video shooting, and vice versa, according to the shooting condition.

FIG. 13 is a graph showing a relation between the distance from the camcorder to the subject (i.e., the subject distance) and the degree to which the subject located at that distance would look stereoscopic (which will be referred to herein as a "stereoscopic property"). Generally speaking, the longer the subject distance, the lesser the stereoscopic property. Stated otherwise, the shorter the subject distance, the greater the stereoscopic property.

In this description, the "subject" is supposed herein to fit one of the following two common definitions:

Case 1: if the camcorder is operating in the manual focus mode, the "subject" is usually the target of shooting on which the shooter has focused; or Case 2: if the camcorder is operating in the autofocus mode, the "subject" is the target of shooting on which the camcorder has focused automatically. In that case, normally, a person, an animal, a plant and/or an object that is/are located around the center of the target of shooting, or a person's face and/or a marked object (which is generally called a "salient object") that have/ has been detected automatically in the shooting range become(s) the subject.

If the video that has been shot consists of only distant subjects as in a landscape shot, then all of those subjects are located at a distance. As described above, the more distant from the camcorder the subject is located, the smaller the amount of parallax of that subject in the video. That is why sometimes it could be difficult for the viewer to sense it as 3D video. This is similar to a situation where the angle of view has become narrower due to an increase in zoom power.

In view of this principle, the camcorder 101 may turn ON and OFF the function of generating 3D video according to the shooting condition and a property of the video shot. A specific method for making such a switch will be described below.

FIG. 14 is a graph showing a relation between the distance from the camcorder to a subject and the number of effective pixels of the subject in a situation where that subject has been shot. The first optical section 300 of the main shooting section 350 has a zoom function. As shown in FIG. 14, if the subject distance is equal to or shorter than the upper limit of the zoom range (in which the number of pixels that form the subject image can be kept constant even if the subject distance has changed by using the zoom function), the first optical section 300 can maintain a constant number of effective pixels by using the zoom function with respect to the subject. However, in shooting a subject, of which the subject distance is beyond the upper limit of the zoom range, the number of effective pixels of the subject decreases as the distance increases. Meanwhile, the second optical section 304 of the sub-shooting section 351 has a fixed focal length function. That is why the number of effective pixels of the subject decreases as the subject distance increases.

In such a situation, if the subject distance, i.e., the distance from the camcorder 101 to the subject, is less than a predetermined value (threshold value), or falls within the range A shown in FIG. 14, the image signal processing section 308 activates the functions of the angle of view matching section 309, the number of pixels matching section 310, the disparity calculating section 311 and the image generating section 312, thereby generating 3D video. On the other hand, if the subject distance is equal to or greater than the predetermined value (threshold value), or falls within the range B shown in FIG. 14, the image signal processing section 308 does not turn ON the angle of view matching section 309, the number of pixels matching section 310, the disparity calculating section 311 or the image generating section 312, but just passes the video frame that has been captured by the main shooting section 350 to the next stage. This subject distance can be measured by using the focal length when the first or second optical section 300, 304 is in focus.

In this manner, the camcorder 101 changes the modes of operation between the processing of outputting 3D video and the processing of outputting no 3D video (i.e., outputting a non-3D video signal) according to a condition of the subject that has been shot (e.g., the distance to the subject, in particular). As a result, video that would not be sensible as 3D video can be presented as ordinary video shot (i.e., non-3D video) to the viewer. By performing such a control operation, 3D video can be generated only when necessary, and therefore, the processing load and the size of the data to process can be reduced.

Alternatively, the camcorder 101 may also determine, according to the amount of parallax that has been detected by the disparity calculating section 311, whether or not 3D video needs to be generated. In that case, the image generating section 312 extracts the maximum amount of parallax included in the video from the depth map that has been generated by the disparity calculating section 311. If the maximum amount of parallax is equal to or greater than a predetermined value (threshold value), the image generating section 312 can conclude that that video would give at least a predetermined degree of stereoscopic impression to the viewer. On the other hand, if the maximum amount of parallax that the image generating section 312 has extracted from the depth map is less than the predetermined value (threshold value), the image generating section 312 can conclude that that 3D video would not give stereoscopic impression to the viewer even when generated. Although the decision is supposed to be made based on the maximum amount of parallax on the video screen in this example, this is only an example of the present disclosure. Alternatively, the decision may also be made based on the percentage accounted by the pixels, of which the amount of parallax is greater than a predetermined value, for the entire video screen.

If the image generating section 312 has decided that 3D video needs to be generated, the camcorder 101 generates and outputs 3D video by the method described above. On the other hand, if the image generating section 312 has concluded that 3D video would not look stereoscopic even when generated, then the image generating section 312 does not generate any 3D video but just outputs the video supplied from the main shooting section 350. As a result, according to the depth map of the video that has been shot, the camcorder 101 can determine whether or not 3D video needs to be generated and output.

Figure 15A:
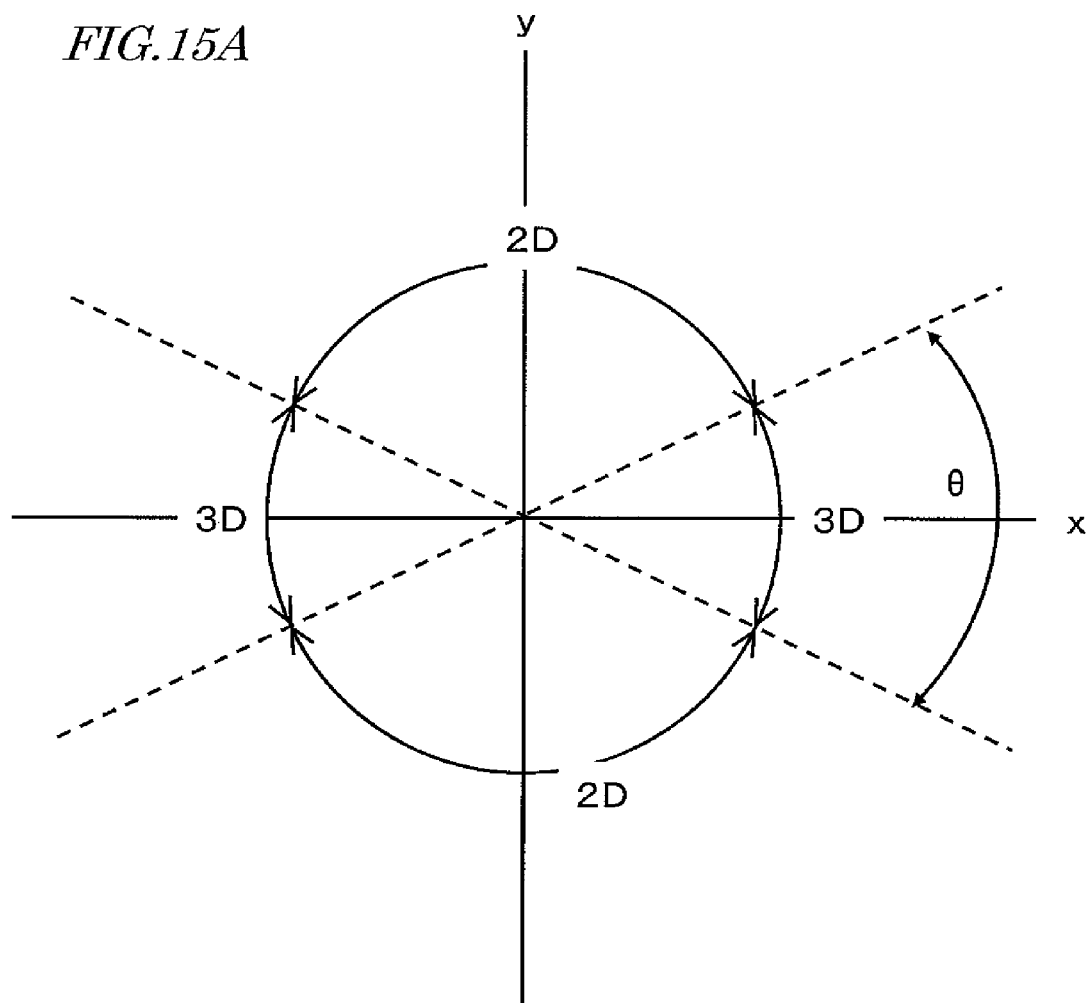
FIG. 15A shows how 3D video may or may not need to be generated according to the tilt in the horizontal direction.

Still alternatively, the decision may also be made, according to the degree of horizontal parallelism described above, whether or not 3D video needs to be output. To the viewer's eye, video with horizontal parallax would look relatively natural but video with vertical parallax could look unnatural. That is why based on the result of detection obtained by the horizontal direction detecting section 318 or the amount of parallax that has been detected by the disparity calculating section 311, the angle of view matching section 309 or the disparity calculating section 311 may sense the degree of horizontal parallelism of the video to be shot and determine whether or not 3D video needs to be generated. For example, if the degree of the horizontal parallelism is represented by an angle falling within a predetermined range (e.g., the θ range in the example illustrated in FIG. 15A as shown in FIG. 15A, the image signal processing section 308 generates and outputs 3D video. On the other hand, if the degree of horizontal parallelism is outside of the predetermined range shown in FIG. 15A, then the image signal processing section 308 outputs the video frame that has been captured by the main shooting section 350. By performing such a control operation, the camcorder 101 can determine, according to the degree of horizontal parallelism, whether or not 3D video needs to be generated and output.

As described above, by adopting any of these methods, the camcorder 101 can automatically change the modes of operation and determine whether or not to generate and output 3D video with its effects (i.e., stereoscopic property) taken into account. In this case, the stereoscopic property may be represented by the zoom power, the maximum amount of parallax and the tilt of the camera described above. If the degree of stereoscopic property is equal to or higher than a reference level, 3D video is output. On the other hand, if the degree of stereoscopic property is short of the reference level, then non-3D video is output.

Figure 15B:
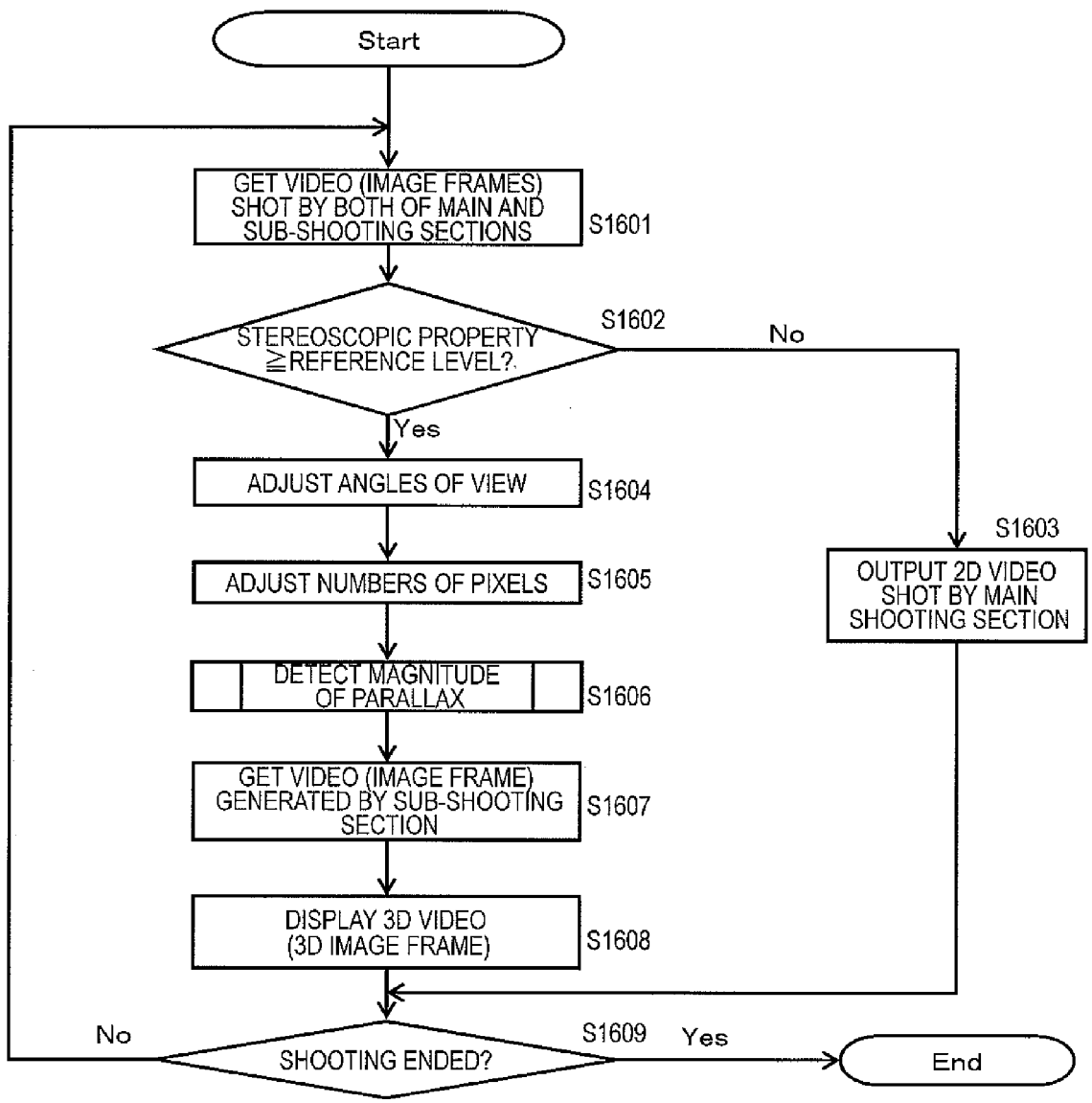
FIG. 15B is a flowchart showing the procedure of processing of deciding whether or not 3D video needs to be generated.

FIG. 15B is a flowchart showing the procedure of the processing to be carried out by the image signal processing section 308 in order to determine whether or not 3D video needs to be generated. Hereinafter, this processing will be described step by step.

First, in Step S1601, the main and sub-shooting sections 350 and 351 capture video frames (image frames).

Next, in Step S1602, the decision is made whether or not the video being shot has a significant stereoscopic property. The decision is made by any of the methods described above. It the stereoscopic property has turned out to be less than the reference level, the process advances to Step S1603. On the other hand, if the stereoscopic property has turned out to be equal to or higher than the reference level, the process advances to Step S1604.

In the processing step S1603, the image signal processing section 308 outputs the 2D video frame that has been captured by the main shooting section 350.

Figure 8:
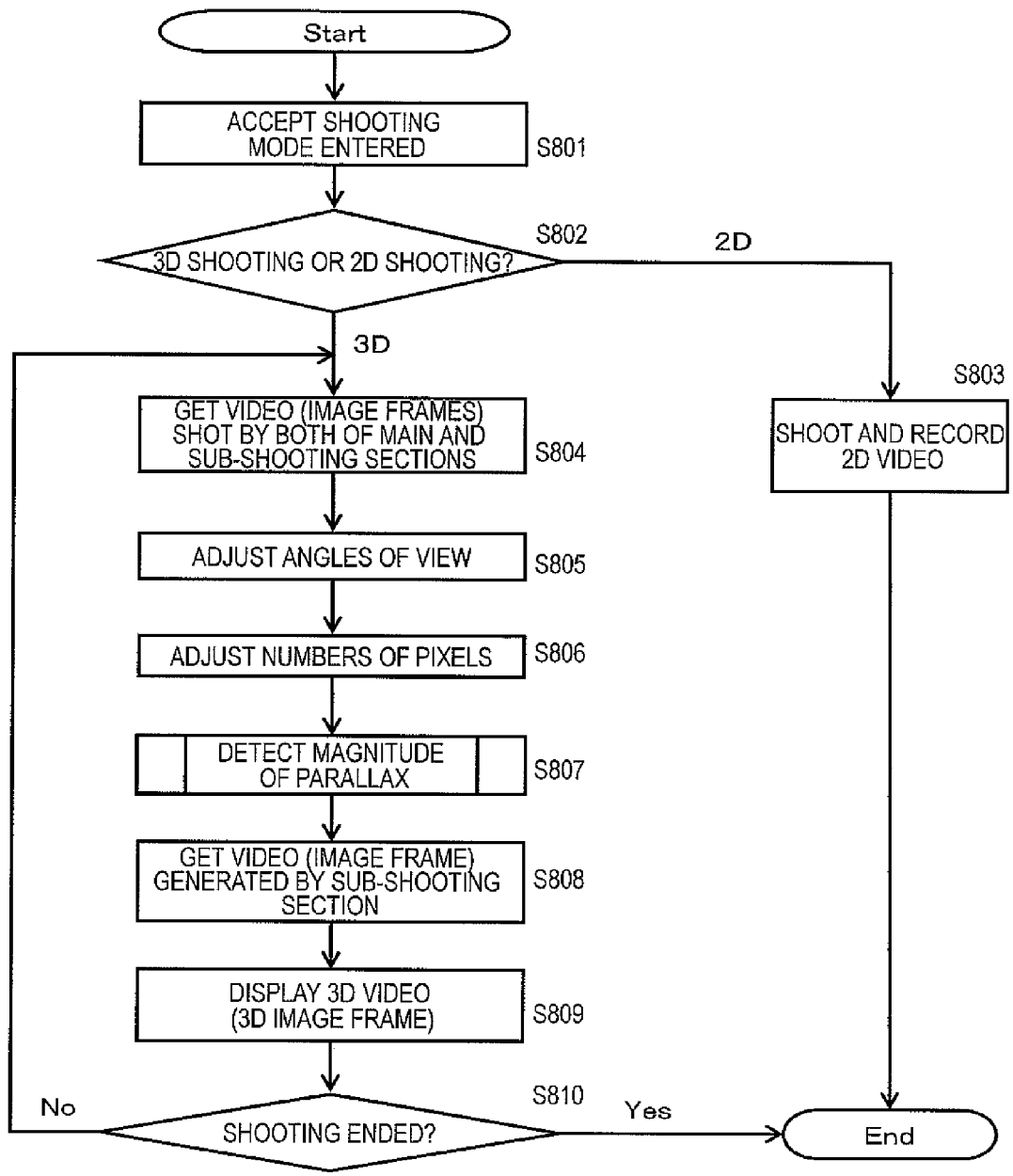
FIG. 8 is a flowchart showing the procedure of the processing carried out by the image signal processing section.

The processing steps S1604 through S1609 that follow are respectively the same as the processing steps S805 through S810 shown in FIG. 8 and description thereof will be omitted herein.

In the embodiment described above, the camcorder is supposed to include the main shooting section 350 with an optical zoom function and the sub-shooting section 351 with an electronic zoom function and a relatively high resolution. However, this is just an example of the present disclosure. Alternatively, the camcorder may also be designed so that the main and sub-shooting sections 350 and 351 have substantially equivalent configurations. Also, the camcorder may also be configured so that its image capturing sections shoot video by a single method. That is to say, the camcorder just needs to generate 3D video based on video frames captured, and may selectively turn ON or OFF the function of generating 3D video or change the modes of operation between 3D video shooting and 2D video shooting according to a shooting condition such as the subject distance and its tilt with respect to the horizontal direction and a condition of the subject that has been shot. By adopting such a configuration, the camcorder can change its modes of operation automatically according to the level of the stereoscopic property of the 3D video that has been shot or generated.

Consequently, the camcorder 101 of this embodiment can change its modes of operation efficiently between video shooting and ordinary 2D video (i.e., non-3D video) shooting according to a shooting condition and a condition on the video that has been shot.

<3D Video Recording Methods>

Next, it will be described with reference to FIG. 16 how to record the 3D video that has been generated. There are several methods for recording the 3D video that has been generated by the angle of view matching section 309, the number of pixels matching section 310, the disparity calculating section 311, and the image generating section 312.

According to the method shown in FIG. 16(a), recorded are the 3D video generated by the image signal processing section 308 (i.e., a main video stream that has been shot by the main shooting section 350) and the video generated by the image signal processing section 308 (i.e., a sub-video stream) to be paired with the former video. According to this method, the right- and left-eye video streams are output as respectively independent data from the image signal processing section 308. The video compression section 315 encodes those left- and right-eye video data streams independently of each other and then multiplexes together the left- and right-eye video streams that have been encoded. Then, the encoded and multiplexed data are written on the storage section 316.

If the storage section 316 is a removable storage device, the storage section 316 just needs to be connected to another player. Then, the data stored in the storage section 316 can be read by that player. Such a player reads the data stored in the storage section 316, demultiplexes the multiplexed data and decodes the encoded data, thereby playing back the left- and right-eye video streams of the 3D video. According to this method, as long as the player has the ability to play 3D video, the player can play the 3D video stored in the storage section 316. As a result, the player can be implemented to have a relatively simple configuration.

According to another method, the video (main video stream) that has been shot by the main shooting section 350 and the depth map that has been generated by the disparity calculating section 311 are recorded as shown in FIG. 16(b). In this method, the video compression section 315 encodes the video that has been shot by the main shooting section 350 and then multiplexes together the encoded video data and the depth map. Then, the encoded and multiplexed data is written on the storage section 316.

According to this method, the player needs to generate a pair of video streams that will form 3D video based on the depth map and the main video stream. That is why the player comes to have a relatively complicated configuration. However, as the data of the depth map can be compressed and encoded to have a smaller data size than the pair of video data streams that will form the 3D video, the size of the data to be stored in the storage section 316 can be reduced according to this method.

According to still another method, a video stream that has been shot by the main shooting section 350 and the difference Δ (Ls/Rs) between the main and sub-video streams, which has been calculated by the disparity calculating section 311, are recorded as shown in FIG. 16(c). In this case, the video compression section 315 encodes the video stream that has been shot by the main shooting section 350 and information indicating the difference Δ (Ls/Rs), and multiplexes the video and the differential data that have been encoded. Then the multiplexed data is written on the storage section 316. In this description, a set of the differences Δ (Ls/Rs) that have been calculated on a pixel-by-pixel basis will be sometimes referred to herein as a "differential image".

According to this method, the player needs to calculate the amount of parallax (which is synonymous with the depth map because the amount of parallax can be converted into a depth map by geometric calculations) based on the difference Δ (Ls/Rs) and the main video stream and generate a pair of video streams that will form 3D video. That is why the player needs to have a configuration that is relatively similar to that of the camcorder. However, since the data about the difference Δ (Ls/Rs) is provided, the player can calculate a suitable amount of parallax (depth map) for itself. If the player can calculate the suitable amount of parallax, then the player can generate and display 3D video with its amount of parallax adjusted according to the size of its own display monitor. 3D video will give the viewer varying degrees of stereoscopic impression (i.e., the feel of depth in the depth direction with respect to the monitor screen) according to the amount of parallax between the left- and right-eye video streams. That is why the degree of stereoscopic impression varies depending on whether the same video is viewed on a big display monitor screen or on a small one. According to this recording method, the player can adjust, according to the size of its own display monitor screen, the amount of parallax of the 3D video to generate. Also, the player can control the presence of the 3D video to display so that the angle defined by the in-focus plane of the left and right eyes with respect to the display monitor screen and the angle defined by the parallax of the 3D video to display can keep such a relation that will enable the viewer to view the video as comfortably as possible. As a result, the quality of the 3D video to view can be further improved.

Figure 16:
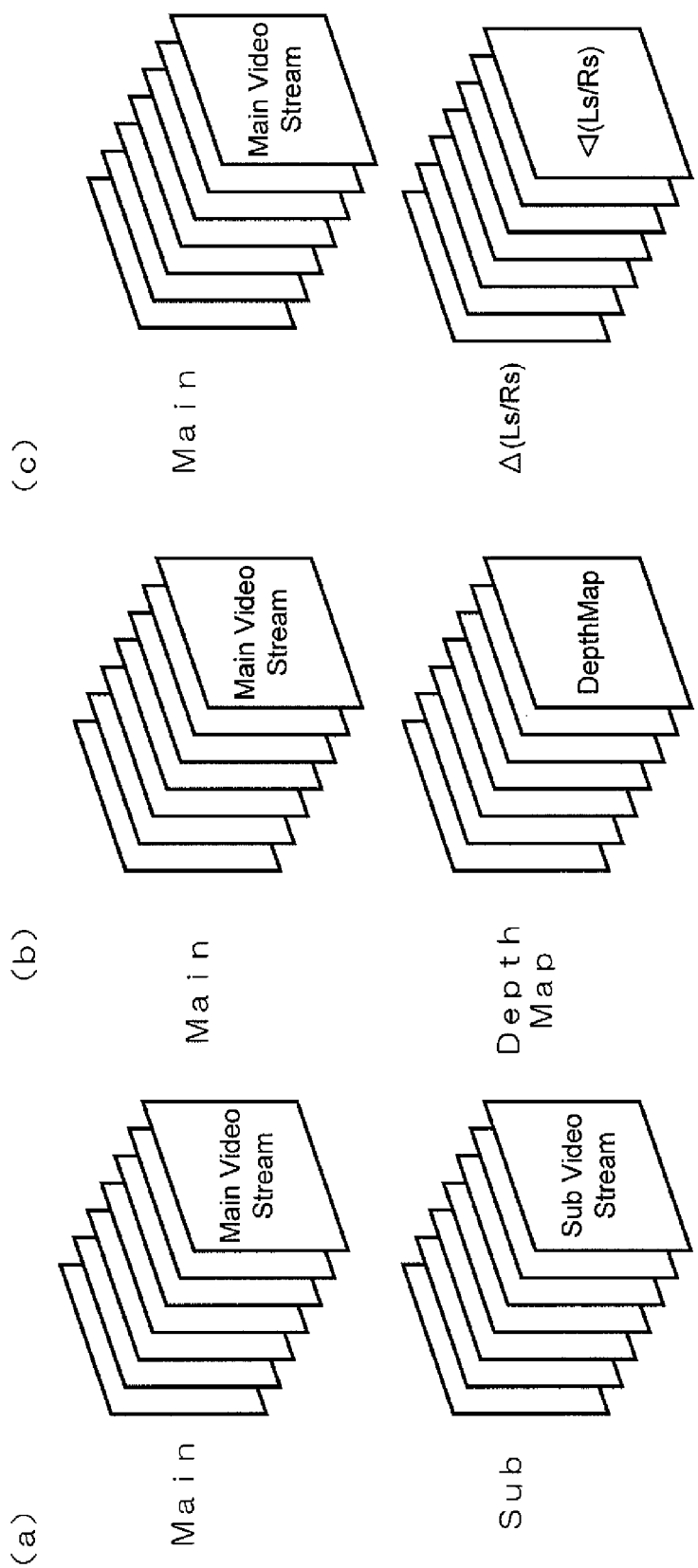
FIG. 16 shows how video shot or 3D video generated may be recorded.

Although not shown in FIG. 16, a method for recording a video stream that has been shot by the main shooting section 350 and a video stream that has been shot by the sub-shooting section 351 may also be adopted. In that case, the video compression section 315 encodes the video streams that have been shot by the main and sub-shooting sections 350 and 351. Furthermore, the video compression section 315 multiplexes the video and differential data that have been encoded. And then the multiplexed data is written on the storage section 316.

According to this method, the camcorder 101 does not need to include the angle of view matching section 2013, the number of pixels matching section 2014, the disparity calculating section 2015 or the image generating section 2016. Instead, the player needs to include the angle of view matching section 2013, the number of pixels matching section 2014, the disparity calculating section 2015 or the image generating section 2016. By performing the same processing as what is carried out by the image signal processing section 308 (including angle of view matching, number of pixels matching, generating a differential image, generating a depth map and correcting the main image using the depth map), the player can generate 3D video. It can be said that according to this method, the image processing section 308 shown in FIG. 3 is provided as an image processor independently of the camcorder and that image processor is built in the player. Even when such a method is adopted, the same functions as what has already been described for the embodiment of the present disclosure can also be performed.

Optionally, depending on who is going to view the 3D video (e.g., whether the viewer-to-be is an adult or a child), the player may adjust the amount of parallax of the video to display. By making such an adjustment, the degree of depth of the 3D video can be changed according to the age of the viewer. Specifically, if the viewer is a child, it is recommended that the degree of depth be reduced. Alternatively, the stereoscopic property of the 3D video may also be changed according to the brightness of the given room. Even in the method shown in FIG. 16(b), these adjustments may also be made at the player end. In that case, the player can receive information about a viewing condition (such as whether the viewer to be is an adult or a child) from a TV set or a remote controller and can change the degree of depth of the video appropriately. It should be noted that the viewing condition does not have to be the age of the viewer to be but may also be any other piece of information indicating any of various other viewer or viewing environment related conditions such as the brightness of the given room and whether the viewer is an authenticated user or not.

Figure 17:
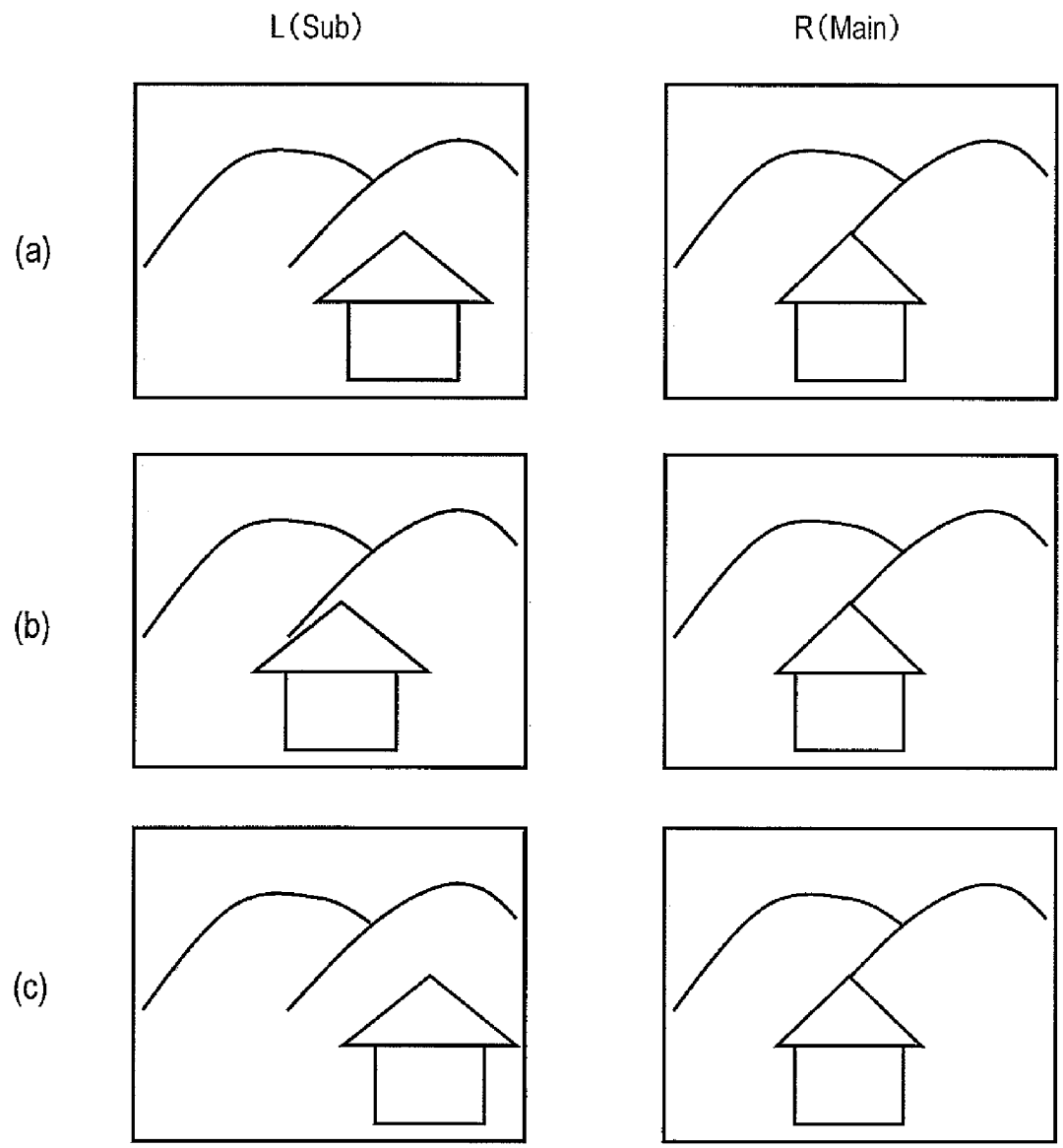
FIG. 17 illustrates an exemplary situation where the camcorder has shot 3D video with its stereoscopic property adjusted during shooting.

FIG. 17(a) illustrates 3D video formed of left and right video frames that have been shot by the camcorder 101. FIG. 17(b) illustrates 3D video with a reduced stereoscopic property, which has been generated by the player. In the video shown in FIG. 17(b), the positions of the building shot as the subject are closer to each other between the left and right video frames compared to the video shown in FIG. 17(a). That is to say, compared to the video shown in FIG. 17(a), the building shot in the sub-video frame is located closer to the left edge. FIG. 17(c) illustrates 3D video with a further reduced stereoscopic property, which has been generated by the player. In the video shown in FIG. 17(c), the positions of the building shot as the subject are more distant from each other between the left and right video frames compared to the video shown in FIG. 17(a). That is to say, compared to the video shown in FIG. 17(a), the building shot in the sub-video frame is located closer to the right edge. In this manner, the player can set the degree of the stereoscopic property arbitrarily according to various conditions.

If the camcorder of this embodiment needs to determine, depending on various conditions, whether 3D video needs to be generated or not as described above, the following pieces of information may be added to any of the recording methods described above. Depending on the shooting condition on which video was shot or conditions on the video shot, the camcorder 101 selectively performs either the processing of generating 3D video (i.e., outputting 3D video) or the processing of generating no 3D video (i.e., not outputting 3D video). That is why in order to enable the player to distinguish a portion where 3D video has been generated from a portion where no 3D video has been generated, the camcorder 101 may write, along with the video to be recorded, identification information for use to make this decision as auxiliary data. It should be noted that the "portion where 3D video has been generated" refers herein to a range of one of multiple frames that form video (i.e., a temporal portion) that has been generated as 3D video. The auxiliary data may be comprised of time information indicating the starting and end times of that portion where 3D video has been generated or time information indicating the starting time and the period in which the 3D video is generated. The auxiliary data does not have to be such time information but may also be frame numbers or the magnitude of offset from the top of video data, for example. That is to say, as long as it includes information that can be used to distinguish a portion where 3D video has been generated from a portion where no video has been generated in the video data to be written, the auxiliary data may be in any of various forms.

The camcorder 101 generates not only such time information that is used to distinguish the portion where video has been generated (i.e., 3D video) from the portion where no 3D video has been generated (i.e., 2D video) but also other pieces of information such as a 2D/3D distinguishing flag. And then the camcorder 101 writes those pieces of information as auxiliary information in AV data (stream) or in a playlist. By reference to the time information and the 2D/3D distinguishing flag included in the auxiliary information, the player can distinguish the 2D/3D shooting periods from each other. And in accordance with those pieces of information, the player can perform playback with the 2D and 3D modes switched automatically, can extract and play only 3D shot interval (or portion), and various other kinds of playback controls.

Such distinguishing information (control information) may be either three-value information indicating whether or not 3D video needs to be output such as "0: unnecessary, 1: necessary, and 2: up to the system" or four-value information indicating the degree of stereoscopic property such as "0: low, 1: medium, 2: high, and 3: too high to be safe". Alternatively, information with only two values or information with more than four values may also be used to indicate whether or not 3D video needs to be generated.

Alternatively, instead of indicating, by using such distinguishing information, whether or not 3D video needs to be output, if the degree of stereoscopic property has turned out to be low by reference to the states of the two video frames and/or the shooting condition, no parallax information may be written for that video frame. In that case, the player may be configured to display 3D video only when receiving the parallax information and display non-3D video when receiving no parallax information.

As will be described later, the information indicating the amount of parallax is a depth map that has been calculated by detecting the amount of parallax of the subject that has been shot. The depth value of each of the pixels that form this depth map may be represented by a bit stream of six bits, for example. In this example, the distinguishing information as the control information may be stored as integrated data in combination with the depth map. Optionally, the integrated data may be embedded at a particular position in a video stream (e.g., in an additional information area or in a user area).

Furthermore, the integrated data in which the distinguishing information as the control information is combined with the depth map may be associated with the time code of a video stream and may be written as a file on a dedicated file storage area (which is a so-called "directory" or "folder" in a file system). It should be noted that the time code is added to each of 30 or 60 video frames per second. Thus, a particular scene can be identified by a series of time codes that start with the one indicating the first frame of that scene and end with the one indicating the last frame of that scene.

Optionally, the distinguishing information as the control information and the depth map may be each associated with the time code of the video stream and those data may be stored in dedicated file storage areas.

By writing the "control information" and the "information indicating the amount of parallax (i.e., depth map)" together in this manner, an exciting scene, of which the amount of parallax between the left and right video streams is set appropriately, and a harmful scene, of which the amount of parallax between the left and right video streams is too large to avoid affecting viewer's health, can be marked. That is why by using that marking, such an exciting scene with a lot of stereoscopic property (i.e., which will give 3D impression) can be searched for (or called) quickly and can be easily applied to making a highlight playback. In addition, by using that marking, scenes that do not need to be output as 3D video or scenes with safety problems can be skipped or those harmful scenes could be processed into safe video again (i.e., converted into safe video through signal processing).

As described above, according to this embodiment, not every shooting section (or shooting unit) has to have a substantially equivalent configuration, and therefore, shooting section that shoots one of the two video streams that form 3D video and a shooting section that shoots video to detect the amount of parallax can have mutually different configurations. In particular, the shooting section that shoots video to detect the amount of parallax could be implemented to have a simpler configuration than the shooting section that shoots one of the two video streams that form video. As a result, a 3D video shooting device with a simpler configuration can be provided.

In the embodiment described above, the video stream shot by the main shooting section 350 is supposed to be handled as the right-eye video stream of 3D video and the video stream generated by the image generating section 312 is supposed to be handled as the left-eye video stream. However, this is just an example of the present disclosure. Alternatively, the main and sub-shooting sections 350 and 351 may have their relative positions changed with each other. That is to say, the video stream shot by the main shooting section 350 may be used as the left-eye video stream and the image generated by the image generating section 312 may be used as the right-eye video stream.

Also, in the foregoing description, the size (288×162 pixels) of the video output by the number of pixels matching section 310 is just an example. According to the present disclosure, such a size does not always have to be used but video of any other size may be handled as well.

Furthermore, in the embodiment described above, the respective lenses of the main and sub-shooting sections 350 and 351 have mutually different configurations. However, those lenses may have the same configuration. For example, the lenses of the main and sub-shooting sections 350 and 351 may be both fixed focal length lenses with the same focal length or with different focal lengths. In any case, since the zoom power of the video to be shot is fixed, the angle of view matching section 310 can determine in advance what portion needs to be cropped when angle of view matching processing is carried out on the video streams shot by the two shooting sections. Alternatively, according to the lens properties of the two shooting sections, the resolutions of the shooting sections may be determined to be the best ones during the design process.

(Embodiment 2)

Hereinafter, a second embodiment of the present disclosure will be described. According to this embodiment, two sub-shooting sections are provided, which is a major difference from the first embodiment. The following description of this second embodiment will be focused on only those differences from the first embodiment, and their common features will not be described all over again to avoid redundancies.

In the cameras disclosed in Patent Documents Nos. 1 and 2, the video that has been shot by the main shooting section is used as a main image, which is one of the two video streams that form 3D video, and an image that has been generated based on the main image is used as a sub-image, which is the other of the two video streams that form the video. The main image has been shot actually, and therefore, has a high degree of reliability. On the other hand, the sub-image has been generated based on the main image by reference to parallax information, and therefore, has a lower degree of reliability than the main image. And when such 3D video is displayed, the left and right images could be different from each other. According to this embodiment, 3D video, of which the left- and right-eye video streams are much less different from each other, can be generated based on the video streams that have been shot by multiple shooting systems.

<Camcorder's Configuration>

Figure 18:
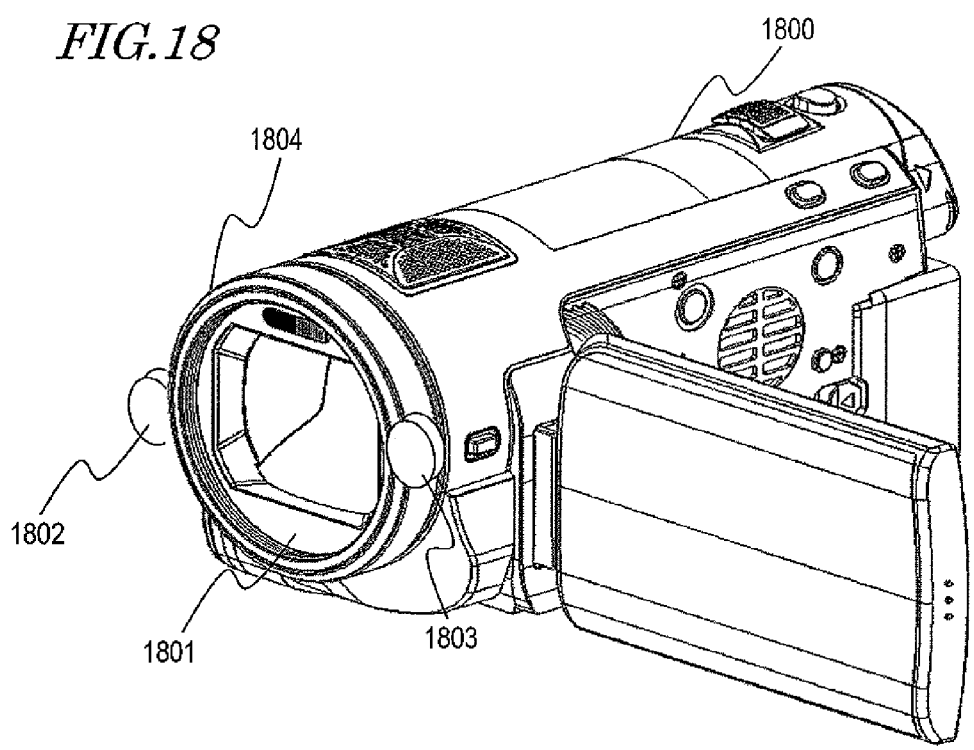
FIG. 18 illustrates the appearance of a camcorder as a second embodiment of the present disclosure.

FIG. 18 illustrates the appearance of a camcorder 1800 as a second embodiment of the present disclosure. The camcorder 1800 shown in FIG. 18 includes a center lens unit 1801 and first and second sub-lens units 1802 and 1803, which are arranged around the center lens unit 1801. The second lens unit 103 of the first embodiment is not provided in this embodiment.

In the example illustrated in FIG. 18, the first and second sub-lens units 1802 and 1803 are arranged near the center lens unit 1801. Although such an arrangement of lenses is supposed to be adopted as an example in this embodiment, the lenses do not always have to be arranged this way. For example, the first and second sub-lens units 1802 and 1803 may also be arranged so that the distance between the first and second sub-lens units 1802 and 1803 becomes approximately equivalent to the interval between the left and right eyes of a human viewer. In that case, as will be described later, the amount of parallax between the left- and right-eye video streams of the 3D video that has been generated based on the video streams shot by the center lens unit 1801 can be closer to the amount of parallax when the object is seen with the person's eyes. Then, it is recommended that the first and second sub-lens units 1802 and 1803 be arranged so that their lens centers are located substantially on the same horizontal plane.

As for the position of the center lens unit 1801, it is recommended that the center lens unit 1801 be located at substantially the same distance from both of the first and second sub-lens units 1802 and 1803. The reason is that in generating left- and right-eye video streams that form video based on the video that has been shot with the center lens unit 1801, the video streams would be horizontally symmetric to each other more easily in that case. In the example illustrated in FIG. 18, the first and second sub-lens units 1802 and 1803 are arranged adjacent to the lens barrel portion 1804 of the center lens unit 1801. In this case, if the center lens unit 1801 has a substantially completely round shape, then the first and second sub-lens units 1802 and 1803 would be located substantially horizontally symmetrically with respect to the center lens unit 1801.

Figure 19:
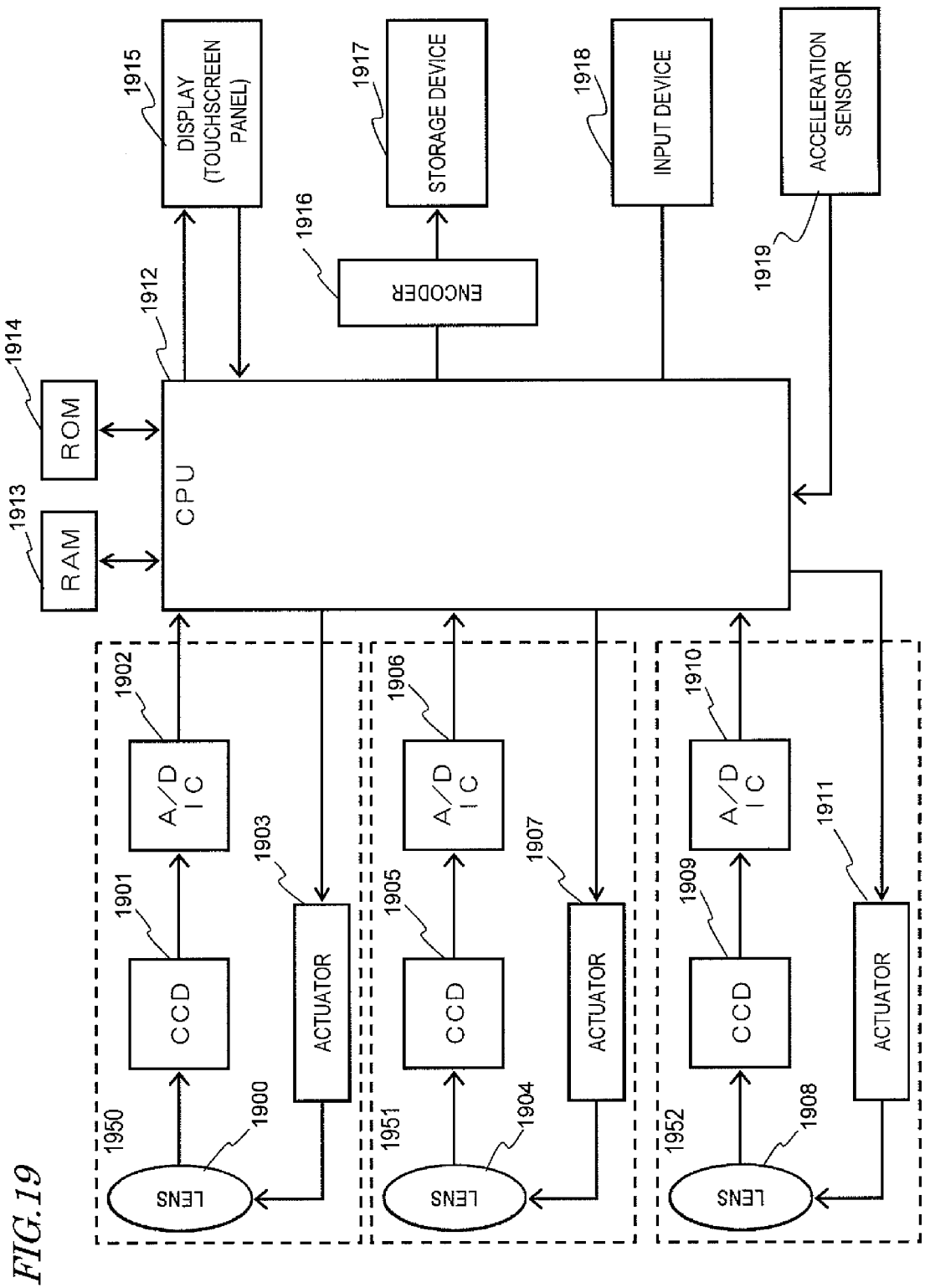
FIG. 19 is a block diagram illustrating a hardware configuration for the camcorder of the second embodiment.

FIG. 19 illustrates a general hardware configuration for this camcorder 1800. Instead of the main shooting unit 250 of the first embodiment, this camcorder 1800 includes a center shooting unit 1950 with a group of lenses of the center lens unit 1801 (which will be referred to herein as a "center lens group 1900"). Also, instead of the sub-shooting unit 251, this camcorder 1800 includes a first sub-shooting unit 1951 with a group of lenses of the first sub-lens unit 1802 (which will be referred to herein as a "first sub-lens group 1904") and a second sub-shooting unit 1952 with a group of lenses of the second sub-lens unit 1803 (which will be referred to herein as a "second sub-lens group 1908"). The center shooting unit 1950 includes not only the center lens group 1900 but also a CCD 1901, an A/D converting IC 1902, and an actuator 1903 as well. The first sub-shooting unit 1951 includes not only the first sub-lens group 1904 but also a CCD 1905, an A/D converting IC 1906, and an actuator 1907 as well. And the second sub-shooting unit 1952 includes not only the second sub-lens group 1908 but also a CCD 1909, an A/D converting IC 1910, and an actuator 1911 as well.

It is recommended that the center lens group 1900 of the center shooting unit 1950 be a group of bigger lenses than the first sub-lens group 1904 of the first sub-shooting unit 1951 or the second sub-lens group 1908 of the second sub-shooting unit 1952. Also, it is recommended that the center shooting unit 1950 have a zoom function. The reason is that as the video shot through the center lens group 1900 forms the base of 3D video to generate, the center shooting unit 1950 suitably has high condensing ability and is able to change the zoom power of shooting arbitrarily.

Meanwhile, the first sub-lens group 1904 of the first sub-shooting unit 1951 and the second sub-lens group 1908 of the second sub-shooting unit 1952 may be comprised of smaller lenses than the center lens group 1900 of the center shooting unit 1950. Also, the first and second sub-shooting units 1951 and 1952 do not have to have the zoom function.

Furthermore, it is recommended that the respective CCDs 1905 and 1909 of the first and second sub-shooting units 1951 and 1952 have a higher resolution than the CCD 1901 of the center shooting unit 1950. The video stream that has been shot with the first or second sub-shooting unit 1951 or 1952 could be partially cropped out by electronic zooming when processed by the angle of view matching section 2013 to be described later. For that reason, it will be beneficial if the resolution of these CCDs is high enough to maintain the definition of the image even in such a situation.

In the other respects, the hardware configuration is the same as that of the first embodiment that has already been described with reference to FIG. 2. And description thereof will be omitted herein.

Figure 20:
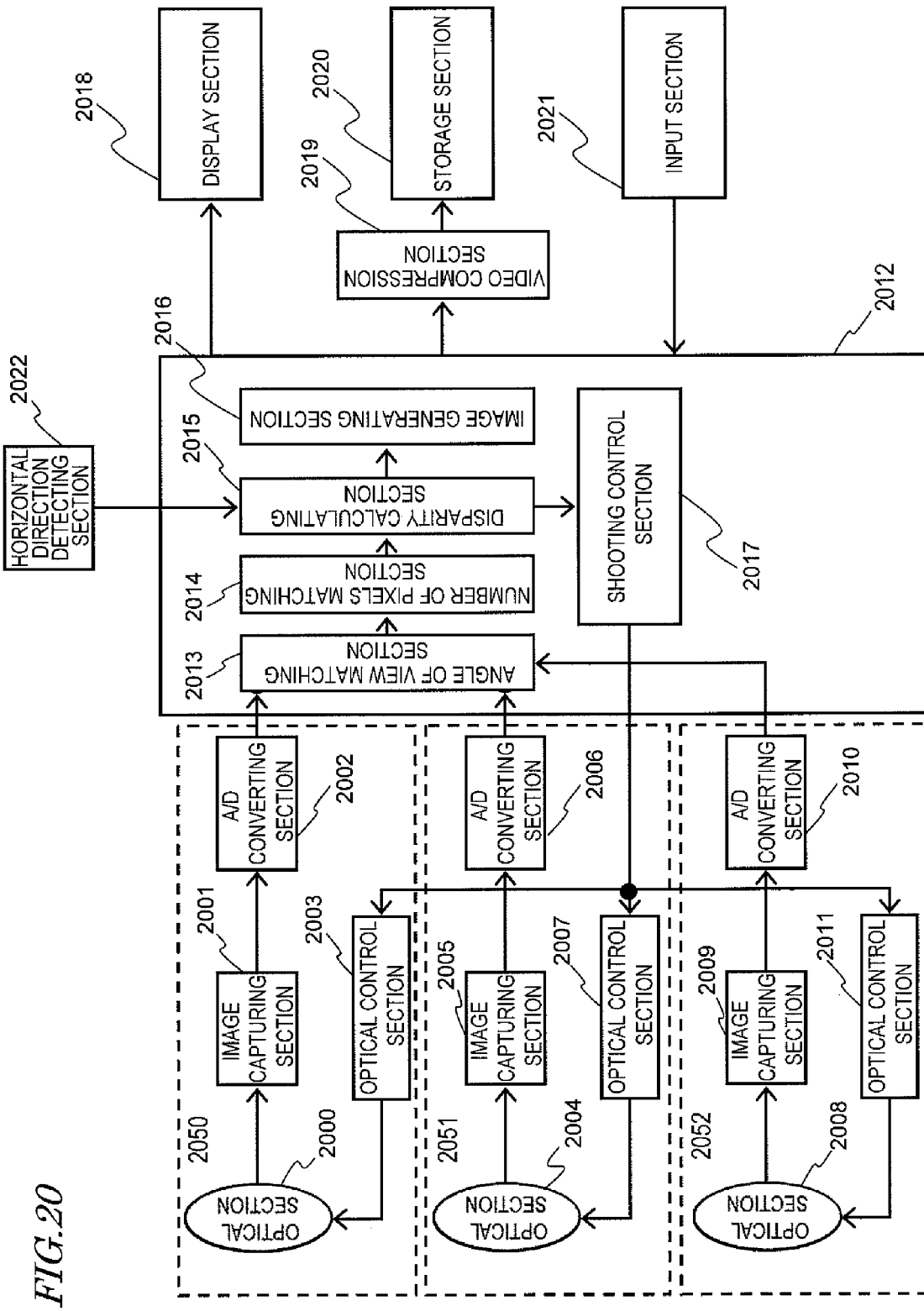
FIG. 20 is a block diagram illustrating a functional configuration for the camcorder of the second embodiment.

FIG. 20 illustrates an arrangement of functional blocks for this camcorder 1800. Compared to the first embodiment, this camcorder 1800 includes a center shooting section (or master shooting section) 2050 instead of the main shooting section 350 and first and second sub-shooting sections (or first and second slave shooting sections) 2051 and 2052 instead of the sub-shooting section 351. However, the center shooting section 2050 and the main shooting section 350 have substantially the same function, and the first and second sub-shooting sections 2051 and 2052 have substantially the same function as the sub-shooting section 351.

Although the camcorder 1800 is supposed to have the configuration shown in FIG. 18 in this embodiment, this is only an example of the present disclosure and this configuration does not have to be adopted. For example, a configuration with three or more sub-shooting sections (or slave shooting sections) may also be adopted. Furthermore, the sub-shooting sections do not always have to be arranged on the same horizontal plane as the center shooting section (or master shooting section). Optionally, one of the slave shooting sections may be intentionally arranged at a different vertical position from the master shooting section or the other slave shooting section. With such a configuration adopted, video that would give the viewer a vertically stereoscopic impression can be shot. By providing multiple slave shooting sections in this manner, the camcorder 1800 can shoot video from various angles. That is to say, multi-viewpoint shooting can be carried out.

Just like the image signal processing section 308 of the first embodiment, the image signal processing section 2012 also includes an angle of view matching section 2013, a number of pixels matching section 2014, a disparity calculating section 2015, an image generating section 2016, and a shooting control section 2017.

The angle of view matching section 2013 matches the respective angles of view of the video streams that have been supplied from the center shooting section 2050 and the first and second sub-shooting sections 2051 and 2052. Unlike the first embodiment described above, the angle of view matching section 2013 performs the processing of matching the respective angles of view of the video streams that have been shot from three different angles.

The number of pixels matching section 2014 performs the processing of matching the respective numbers of pixels of the three video streams that have had their angles of view matched to each other by the angle of view matching section 2013.

The disparity calculating section 2015 detects the amount of parallax of the subject that has been shot based on the three video streams that have had their angles of view and numbers of pixels matched to each other by the angle of view matching section 2013 and the number of pixels matching section 2014, thereby generating a depth map.

By reference to the amount of parallax (i.e., the depth map) of the subject shot, which has been generated by the disparity calculating section 2015, the image generating section 2016 generates left- and right-eye video streams that form 3D video based on the video that. has been shot by the center shooting section 2050.

According to the amount of parallax that has been calculated by the disparity calculating section 2015, the shooting control section 2017 controls the shooting conditions on the center shooting section 2050 and the first and second sub-shooting sections 2051. and 2052.

The horizontal direction detecting section 2022, the display section 2018, the video compression section 2019, the storage section 2020 and the input section 2021 are respectively the same as the horizontal direction detecting section 318, the display section 314, the video compression section 315, the storage section 316 and the input section 317 of the first embodiment described above, and description thereof will be omitted herein.

<3D Video Signal Generation Processing>

Hereinafter, 3D video signal generation processing according to this embodiment will be described. The 3D video signal generation processing of this embodiment is significantly different from that of the first embodiment in the following respects. Specifically, three video signals are supplied to the image signal processing section 2012 from the center shooting section 2050 and the first and second sub-shooting sections 2051 and 2052, and the amount of parallax is calculated based on the video signals supplied from those three shooting sections. After that, by reference to the amount of parallax thus calculated, left- and right-eye video streams that will newly form 3D video are generated based on the video that has been shot by the center shooting section 2050.

If in the processing step of computing and generating 3D video based on the so-called "stereo base distance" corresponding to the interval between a person's right and left eyes and the parallax information, these computational coefficients are changed, the presence of the 3D video can be controlled. As a result, the quality of the 3D video to be viewed can be further improved.

Figure 21:
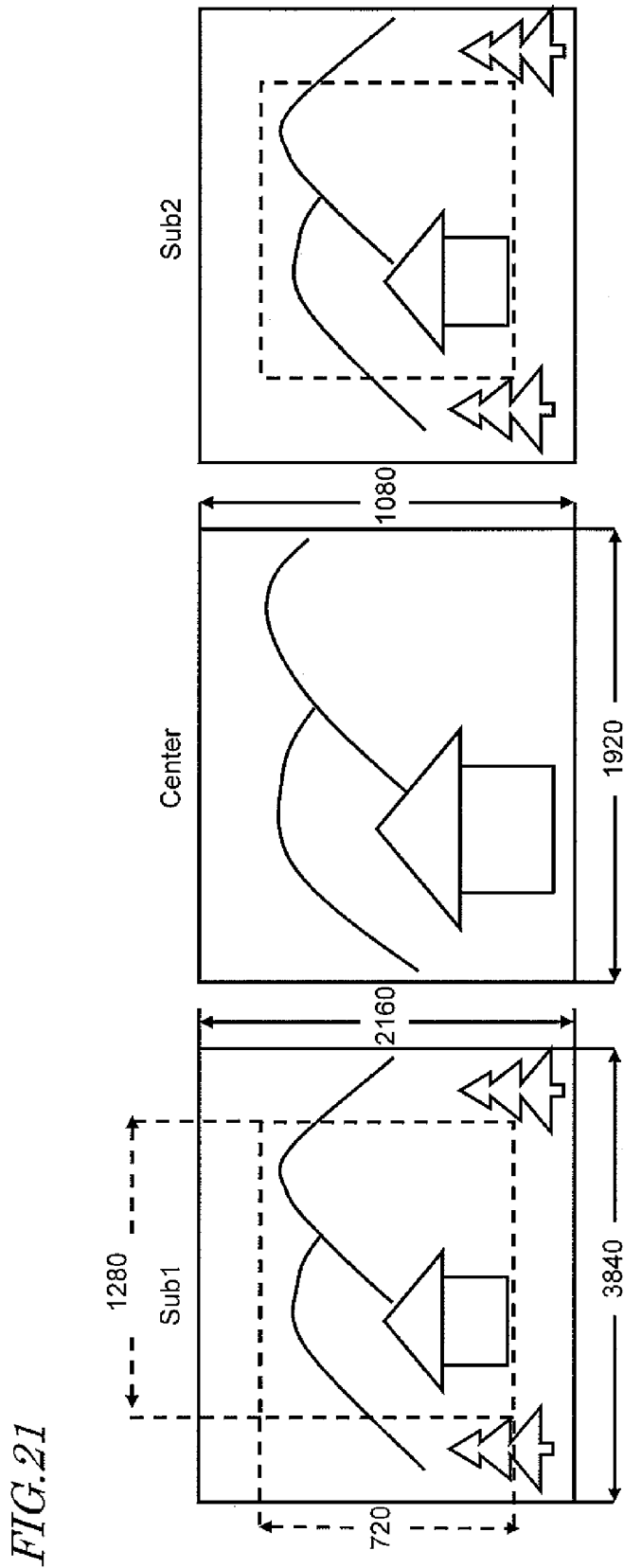
FIG. 21 illustrates how to match the respective angles of view of the video frames that have been shot by a center shooting section and first and second sub-shooting sections.

FIG. 21 shows how the angle of view matching processing is performed by the angle of view matching section 2013 on the three video frames supplied thereto. Using the video frame Center that has been shot by the center shooting section 2050 as a reference, the angle of view matching section 2013 does the work of cropping portions that have the same angle of view as what has been shot by the center shooting section 2050 from the video frames Sub1 and Sub2 that have been shot by the first and second sub-shooting sections 2051 and 2052. In that case, the angle of view matching section 2013 may either match the angles of view based on the video supplied as in the first embodiment described above or determine the angle of view according to the contents of the control operation performed by the shooting control section 2017 during shooting (e.g., the zoom power of the center shooting section 2050 and the fixed focal length of the first and second sub-shooting sections 2051 and 2052, in particular).

In the example illustrated in FIG. 21, by reference to the video frame with a size of 1920×1080 pixels that has been shot by the center shooting section 2050, a portion with a size of 1280×720 pixels having the same angle of view is cropped from each of the video frames with a size of 3840×2160 pixels that have been shot by the first and second sub-shooting sections 2051 and 2052.

Figure 22:
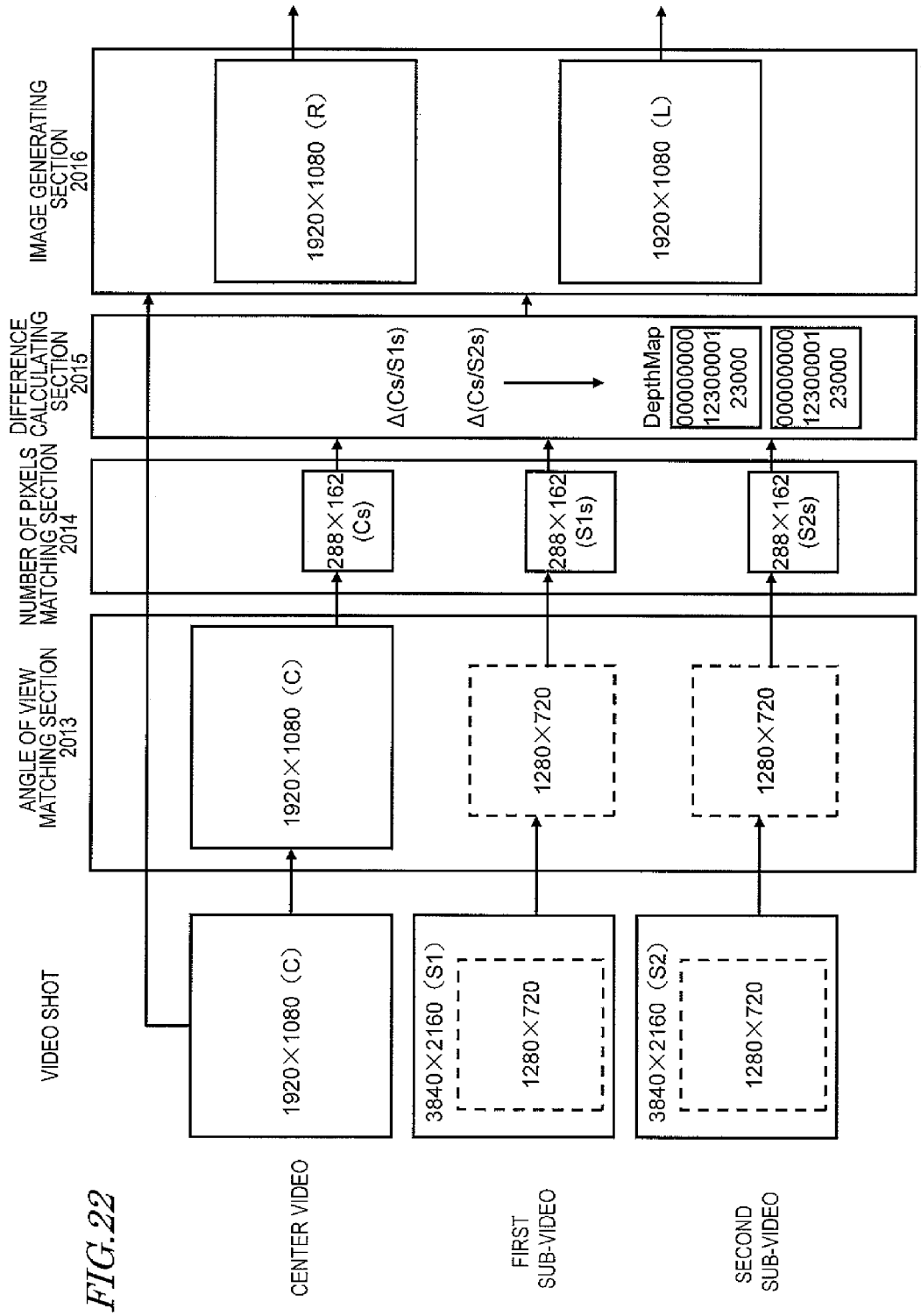
FIG. 22 shows how the data processed by an image signal processing section varies.

FIG. 22 shows a result of the processing that has been performed by the angle of view matching section 2013, the number of pixels matching section 2014, the disparity calculating section 2015 and the image generating section 2016. As in the example described above, the number of pixels matching section 2014 performs the processing of matching the respective numbers of pixels of the three video frames that have had their angles of view matched to each other. In this example, the video frame that has been shot by the center shooting section 2050 has a size of 1920×1080 pixels, while the video frames that have been shot by the first and second sub-shooting sections 2051 and 2052 and then cropped both have a size of 1280×720 pixels. As shown in FIG. 22, the number of pixels matching section 2014 matches these numbers of pixels to a size of 288×162 as in the first embodiment described above. The reason is that in order to get the image signal processing done easily by the image signal processing section 2012 as a whole, it is a good measure to take to match the sizes of the three video frames to a predetermined target size. For that reason, it is recommended that instead of simply matching the numbers of pixels to one of the three video frames that has a smaller number of pixels than any other video frame, not only the respective numbers of pixels of the three video frames are matched to each other but also the image size is changed to the one that is easily processed by the overall system.

Although the processing is supposed to be carried out as described above in this embodiment, this is only an example of the present disclosure and such processing is not always performed. Optionally, the processing may also be carried out so that the respective numbers of pixels are matched to the video frame that has a smaller number of pixels than any of the other two video frames.

The disparity calculating section 2015 detects the amount of parallax between the three video frames. Specifically, the disparity calculating section 2015 obtains, through calculations, information indicating the difference A (Cs/S1s) between the center video frame Cs shot by the center shooting section 2050 and the first sub-video frame S1s shot by the first sub-shooting section 2051, which have had their numbers of pixels matched to each other by the number of pixels matching section 2014. In addition, the disparity calculating section 2015 also obtains, through calculations, information indicating the difference Δ (Cs/S2s) between the center video frame Cs shot by the center shooting section 2050 and the second sub-video frame S2s shot by the second sub-shooting section 2052, which have had their numbers of pixels matched to each other by the number of pixels matching section 2014. Based on these pieces of differential information, the disparity calculating section 2015 defines information indicating the respective amounts of parallax of the left- and right-eye video frames (i.e., a depth map) as shown in FIG. 22.

In determining the respective amounts of parallax of the left- and right-eye video frames based on those differences Δ (cs/S1s) and Δ (Cs/S2s), the disparity calculating section 2015 suitably takes the degree of horizontal symmetry into account. For example, if there is any pixel at which significantly great parallax is produced only on the left-eye video frame but at which no parallax is produced at all on the right-eye video frame, then the more reliable value is adopted in determining the amount of parallax at such an extreme pixel. That is to say, it is recommended that the amount of parallax be finally determined with the respective amounts of parallax of the left- and right-eye video frames taken into account in this manner. In that case, even if any disorder (such as disturbed video) occurred locally in one of the video frames supplied from the first and second sub-shooting sections 2051 and 2052, the disparity calculating section 2015 can also reduce the influence on the amount of parallax calculated according to the degree of symmetry between the left- and right-eye video frames.

Figure 23:
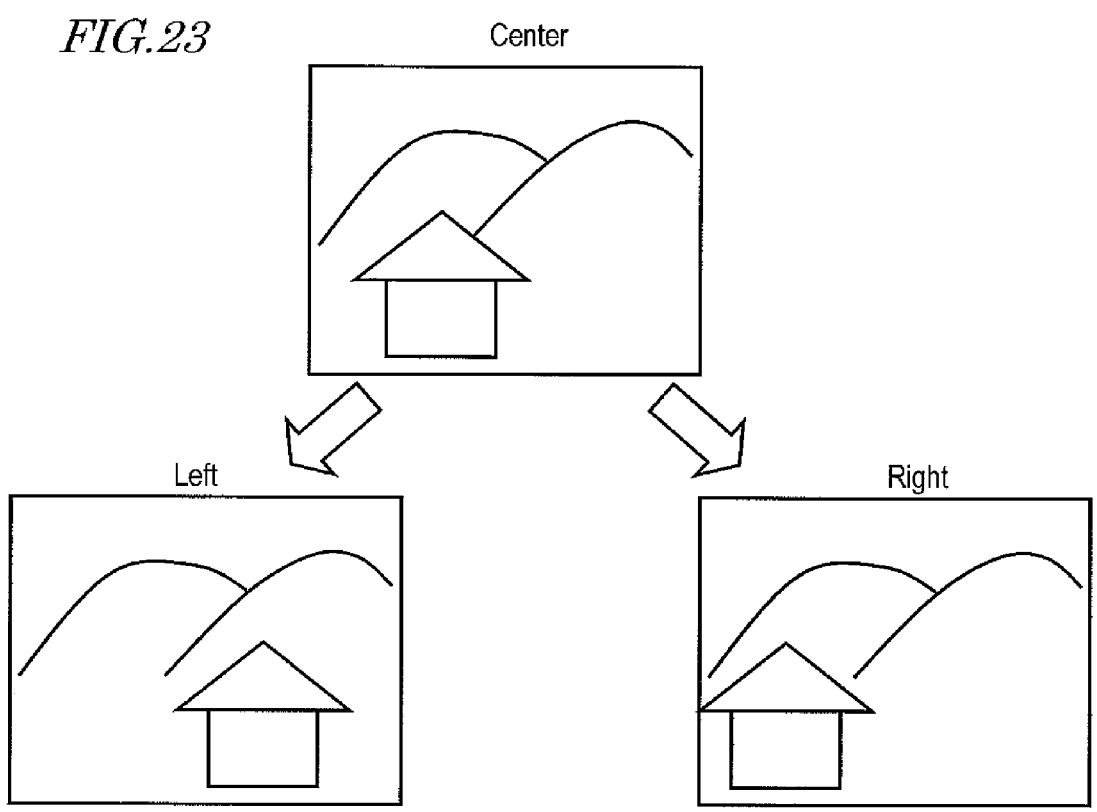
FIG. 23 illustrates how to generate left and right video streams that will form 3D video based on the video that has been shot by the center shooting section.

The image generating section 2016 generates left- and right-eye video frames that will form 3D video based on the depth map generated by the disparity calculating section 2015 and the video frame shot by the center shooting section 2050. Specifically, as shown in FIG. 23, either the subject or a video portion is moved by reference to the depth map either to the left or to the right according to the amount of parallax with respect to the video that has been shot by the center shooting section 2050, thereby generating a right-eye video frame Right and a left-eye video frame Left. In the example shown in FIG. 23, in the left-eye video frame generated by the first sub-shooting section 2051, the building shot as the subject has shifted to the right by the amount of parallax with respect to its position on the center video frame. On the other hand, the background portion is the same as in the video frame shot by the center shooting section 2050 because the amount of parallax is small. In the same way, in the right-eye video frame, the building shot as the subject has shifted to the left by the amount of parallax with respect to its position on the center video frame. On the other hand, the background portion is the same as in the video frame shot by the center shooting section 2050 for the same reason.

<Shooting Video by Reference to Parallax Information>

The shooting control section 2017 performs a control operation as in the first embodiment described above. Specifically, the center shooting section 2050 mainly shoots a video frame that forms the base of 3D video, while the first and second sub-shooting sections 2051 and 2052 shoot video frames that are used to get parallax information with respect to the video frame that has been shot by the center shooting section 2050. That is why the shooting control section 2017 gets effective shooting controls performed on the first optical section 2000 and first and second sub-optical sections 2004 and 2008 by the optical control sections 2003, 2007 and 2011 according to their intended use. Examples of such shooting controls include exposure and autofocus controls as in the first embodiment described above.

On top of that, in this embodiment, since there are three shooting sections, namely, the center shooting section 2050 and first and second sub-shooting sections 2051 and 2052, the shooting control section 2017 also controls the cooperation between these three shooting sections. In particular, the first and second sub-shooting sections 2051 and 2052 shoot video frames that are used to get pieces of parallax information for the left- and right-eye video frames when 3D video is going to be generated. For that reason, the first and second sub-shooting sections 2051 and 2052 suitably perform symmetric controls in cooperation with each other. Thus, in controlling the first and second sub-shooting sections 2051 and 2052, the shooting control section 2017 performs a control operation with these constraints taken into account.

3D video is generated by reference to the degree of horizontal parallelism information, and the decision is made whether or not 3D video needs to be generated, as in the first embodiment described above, and description thereof will be omitted herein.

<3D Video Recording Methods>

As in the first embodiment described above, multiple methods may be used in this embodiment to record 3D video. Hereinafter, those recording methods will be described with reference to FIG. 24.

FIG. 24(*a*) shows a method in which the left and right video streams that have been generated by the image generating section 2016 to form 3D video are encoded by the video compression section 2019 and in which the encoded data is multiplexed and then stored in the storage section 2020. According to this method, as long as the player can divide the data written into data streams for the left and right video streams and then decode and read those data streams, the 3D video recorded can be reproduced. That is to say, an advantage of this method is that the player can have a relatively simple configuration.

On the other hand, FIG. 24(b) shows a method for recording the center video stream (main video stream) shot by the center shooting section 2050 to form the base of 3D video and the respective depth maps (i.e., the amounts of parallax) of the left and right video streams with respect to the center video stream. According to this method, the video compression section 2019 encodes, as data, the video stream that has been shot by the center shooting section 2050 and the left and right depth maps with respect to that video stream. After that, the video compression section 2019 multiplexes those encoded data and writes them on the storage section 2020. In that case, the player reads the data from the storage section 2020, classifies it according to the data types, and then decodes those classified data. Furthermore, based on the center video stream decoded, the player generates and displays left and right video streams that will form 3D video by reference to the left and right depth maps. An advantage of this method is that the size of data to be written can be reduced by using only a single video data stream, which usually has a huge data size, and also recording depth maps that need to be used to generate left and right video streams.

According to the method shown in FIG. 24(c), the video stream shot by the center shooting section 2050 to form the base of 3D video is also recorded as in FIG. 24(b). In this method, however, information (i.e., differential images) indicating the difference between the video stream shot by the center shooting section 2050 and the video stream shot by the first sub-shooting section 2051 and the difference between the video stream shot by the center shooting section 2050 and the video stream shot by the second sub-shooting section 2052 is written instead of the depth map information, which is a major difference from the method shown in FIG. 24(b). According to this method, the video compression section 2019 encodes the video stream shot by the center shooting section 2050 and the left and right differential information Δ (Cs/Rs) and Δ (Cs/Ls) with respect to the center shooting section 2050, multiplexes them and writes them on the storage section 2020. The player classifies the data stored in the storage section 2020 according to the data type and decodes them. After that, the player calculates depth maps based on the differential information Δ (Cs/Rs) and Δ (Cs/Ls) and generates and displays left and right video streams that form 3D video based on the video stream that has been shot by the center shooting section 2050. An advantage of this method is that the player can generate depth maps and 3D video according to the performance of its own display monitor. As a result, 3D video can be played back according to the respective playback conditions.

By adopting such a configuration, the camcorder of this embodiment can generate left and right video streams that will form 3D video based on the video stream that has been shot by the center shooting section 2050. If one of the left and right video streams has been shot actually but if the other video stream has been generated based on the former video stream that has been shot actually as in the related art, then the degrees of reliability of the left and right video streams will be significantly imbalanced. On the other hand, according to this embodiment, both of the left and right video streams have been generated based on the basic video stream that has been shot. That is why video can be generated with the horizontal symmetry as 3D video taken into account. Consequently, more horizontally balanced, more natural video can be generated.

In addition, as in the first embodiment described above, not every shooting section (shooting unit) has to have substantially equivalent configurations, and therefore, the center shooting section 2050 that shoots a video stream to form the base of 3D video and the sub-shooting sections 2051 and 2052 that shoot video streams that are used to detect the amount of parallax may have different configurations. In particular, the sub-shooting sections 2051 and 2052 that are used to detect the amounts of parallax could be implemented to have a simpler configuration than the center shooting section 2050. As a result, a 3D video shooting device 1800 with an even simpler configuration is provided.

As in the embodiments described above, the size of the video stream output by the number of pixels matching section 2014 in this embodiment is just an example and does not always have to be adopted according to the present disclosure. A video stream of any other size may also be handled.

(Modidied Examples of Embodiments)

In the first and second embodiments described above, the camcorder shown in FIG. 1B or FIG. 18 is supposed to be used. However, these are just examples of the present disclosure and the camcorder may have any other configuration. For example, the camcorder may also have the configuration shown in FIG. 25.

Figure 25A:
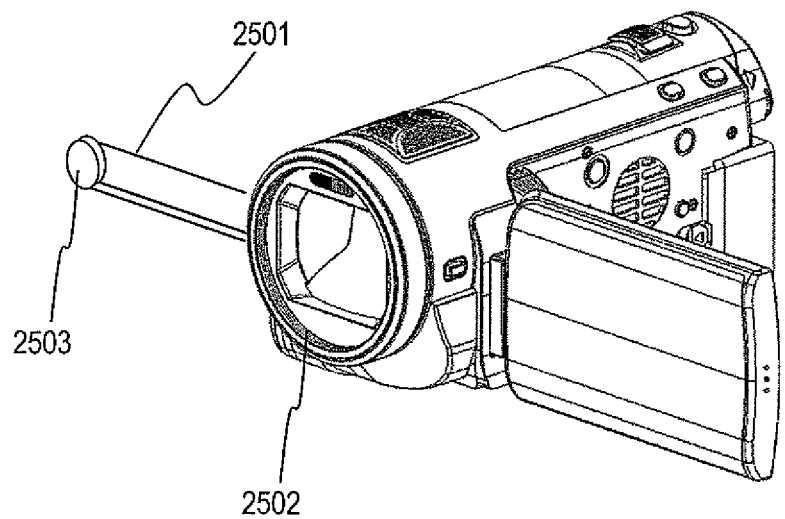
FIGS. 25A and 25B illustrate the appearances of two camcorders as modified examples of the first and second embodiments.

FIG. 25A illustrates an exemplary arrangement in which a sub-shooting unit 2503 is arranged on the left-hand side of a main shooting unit 2502 on a front view of the camcorder. In this configuration, the sub-shooting unit 2503 is supported by a sub-lens supporting portion 2501 and arranged distant from the body. Contrary to the first embodiment described above, the camcorder of this example can use the video shot by the main shooting section as left video stream.

Figure 25B:
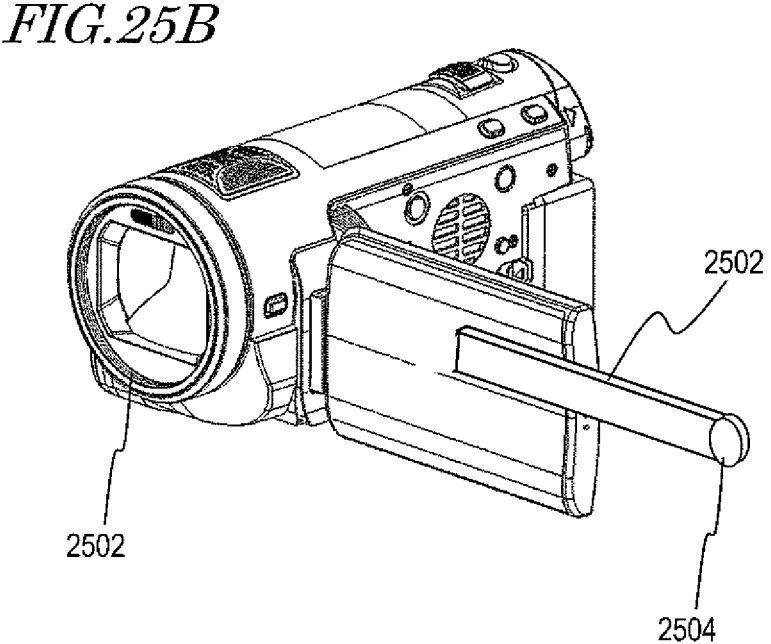

FIG. 25B illustrates an exemplary arrangement in which a sub-shooting unit 2504 is arranged on the right-hand side of the main shooting unit 2502 on a front view of the camcorder conversely to the arrangement shown in FIG. 25A. In this configuration, the sub-shooting unit 2504 is supported by a sub-lens supporting portion 2502 and arranged distant from the body. In such a configuration, there is a longer distance between the main shooting unit 2502 and the sub-shooting unit 2504 than in the configuration of the first embodiment, and therefore, the camcorder can shoot video with greater parallax.

In the configurations of the first and second embodiments described above in which the main shooting section (or center shooting section) has a zoom lens and the sub-shooting sections have a fixed focal length lens, the camcorder may also be configured to shoot 3D video so that the focal length of the zoom optical system agrees with the focal length of the fixed focal length lens. In that case, 3D video will be shot with the main and sub-shooting sections having the same optical zoom power. If no 3D video is shot but if non-3D video is shot as in the related art, then the main shooting section may shoot video with its zoom lens moved. With such a configuration adopted, 3D video is shot with the zoom powers of the main and sub-shooting sections set to be equal to each other. As a result, the image signal processing section can perform the angle of view matching processing and other kinds of processing relatively easily.

Also, even if the main shooting section shoots a video stream with the zoom lens moved while 3D video is being shot, the 3D video may be generated only if the electronic zoom power at which the angle of view matching section of the image processing section crops a corresponding portion from the video stream that has been shot by the sub-shooting section falls within a predetermined range (e.g., only when the zoom power is 4× or less). The camcorder may be configured so that if the zoom power exceeds that predetermined range, the 3D video stops being generated and the image signal processing section outputs ordinary non-3D video that has been shot by the main shooting section. In that case, since the zoom power is high, 3D video will stop being generated in the shot portion where the depth information calculated (i.e., the depth map) turns out to have a low degree of reliability. As a result, the quality of the 3D video generated can be kept relatively high.

Furthermore, if depth information (depth map) has been obtained in the configuration in which the main shooting section has a zoom lens and the sub-shooting sections have a fixed focal length lens, then the optical diaphragm of the zoom optical system or the fixed-focal-length optical system may be removed. For example, suppose in 3D video shot, a subject that is located at or more distant than 1 m from the camcorder is in focus over the entire screen. In that case, since the subject is in focus over the entire screen, defocused (or blurred) video can be generated through image processing. According to the optical diaphragm method, a depth range to produce blur is determined uniquely by the aperture size of the diaphragm due to a property of the optical system. On the other hand, according to image processing, the depth range to have enhanced definition and the depth range to produce blur intentionally can be controlled arbitrarily. For example, the depth width of the depth range to have enhanced definition may be broader than the situation where the optical diaphragm is used and the definition of the subject can be enhanced in multiple depth ranges.

Furthermore, the optical axis direction of the main shooting section 350 or the sub-shooting section 351 may be shifted. That is to say, the camcorder may change the modes of 3D shooting from the parallel mode into the crossing mode, or vice versa. Specifically, by getting a lens barrel and an image capturing section including the lens that forms part of the sub-shooting section 351 driven by a controlled motor, for example, the optical axis can be shifted. With such a configuration adopted, the camcorder can change the modes of shooting from the parallel method into the crossing method, or vice versa, according to the subject or the shooting condition. Or the position of the crossing point may be moved in the crossing mode or any other kind of control may be performed. Optionally, such a control may also be carried out as an electronic control instead of the mechanical control using a motor, for example. For example, as the lens of the sub-shooting section 351, a fish-eye lens that has a much wider angle than the lens of the main-shooting section 350 may be used. In that case, the video stream that has been shot by the sub-shooting section 351 has a broader range (i.e., a wider angle) than a video stream shot through a normal lens, and therefore, includes the video stream that has been shot by the main shooting section 350. By reference to the video that has been shot by the main shooting section 350, the angle of view matching section crops a range that will be included when shot in the crossing mode from the video stream that has been shot by the sub-shooting section 351. The video that has been shot through a fish-eye lens is likely to have a distorted peripheral portion by nature. In view of this consideration, the angle of view matching section also makes distortion correction on the image while cropping that video portion. As a result, even without mechanically shifting the optical axes of the main shooting section 350 and the sub-shooting section 351, the camcorder can also carry out the parallel mode and crossing mode shooting sessions by electronic processing. In that case, it is recommended that the resolution of the sub-shooting section 351 be set to be sufficiently higher (e.g., twice or more as high as) that of the main shooting section 350. The reason is that as the video stream that has been shot by the sub-shooting section 351 is supposed to be cropped through the angle of view matching processing, the portion to be cropped needs to have as high a resolution as possible. In this example, it has been described how to use a wide angle lens such as a fish-eye lens in the configuration of the first embodiment. However, even if the configuration of the second embodiment (including a center lens and first and second sub-lenses) is adopted, the method described above is applicable to two of the at least three lenses.

Furthermore, the disparity calculating section 311 or 2015 may change the accuracy with which (or the step width at which) depth information (depth map) is calculated according to the position, distribution and contour of the subject within the angle of view of shooting. For example, the disparity calculating section 311 or 2015 may set the step width of the depth information to be broad with respect to a certain subject and may set the step width of the depth information inside that subject to be fine. That is to say, the disparity calculating section 311 or 2015 may define depth information that has a hierarchical structure inside and outside of the subject according to the angle of view of the video be shot or the contents of the composition.

As for the parallax of a stereoscopic image, the amount of parallax decreases in a distant subject as already described with reference to FIG. 13. That is why if the subject distances (or subject distance ranges) in three situations where the amounts of parallax are three, two and one pixel, respectively, are compared to each other with respect to an image with a horizontal resolution of 288 pixels, then it can be seen that the smaller the amount of parallax, the broader the subject distance range. That is to say, the more distant the subject is, the smaller the sensitivity of the variation in the amount of parallax to the variation in subject distance. Thus, the more distant the subject is, the more and more often the subject within the subject distance range with the same amount of parallax is sensed to have the same depth. As a result, a so-called "backdrop" effect is produced. In this description, the "backdrop" effect refers herein to a phenomenon that a certain portion of a video frame looks flat just the backdrop of stage setting at a theater.

That is why if the variation in depth can be estimated based on the contour line and the tilt of the plane by extracting the contour and texture of the video, then the amount of parallax of one pixel can be evenly divided into two or four based on that variation in depth. By dividing the amount of parallax evenly into two or four in this manner, the sensitivity of the parallax can increased twice or four times. As a result, the backdrop effect can be reduced.

In this manner, the disparity calculating section 311 or 2015 can calculate the depth information more accurately and can represent a subtle depth in an object. In addition, the camcorder can also turn 3D video to generate into video with varying portions by intentionally increasing or decreasing the depth of a characteristic portion of 3D video to generate. Furthermore, as another application, the camcorder can also calculate and generate an image as viewed from an arbitrary viewpoint by applying the principle of the trigonometry to the depth information and the main image.

Generally speaking, in a situation where given video includes 3D information, if the camcorder itself further includes storage means and learning means and does learn something about the video and stores it over and over again, then the camcorder can understand the composition of the given video, comprised of a subject and the background, as well as a human being does. For example, if the distance of a subject is known, then that subject can be identified by its size, contour, texture, color or motion (including information about the acceleration or angular velocity). Consequently, without cropping only a subject in a particular color as in the chroma key processing, an image representing a person or an object at a particular distance can be cropped, and even an image representing a particular person or object can also be cropped based on a result of the recognition. If the given video includes 3D information, the technique of the present disclosure can be extended to the computer graphics (CG) processing. As a result, video shot and computer generated video data may be synthesized together in virtual reality (VR), augmented reality (AR), mixed reality (MR) and other applications.

Other than that, it is also possible to make the camcorder recognize the infinitely spreading blue region in the upper part of a video frame to be the blue sky and white fragments scattered on the blue sky region of the video to be clouds. Likewise, it is also possible to make the camcorder recognize a grey region spreading from the middle toward the lower portion of the video frame to be a road and an object having transparent portions (i.e., a windshield and windows) and black round doughnut portions (i.e., tires) to be a car. Furthermore, even if the object has a car shape, the camcorder can determine, by measuring the distance, whether the object is a real car or a toy car. Once the distance of a person or an object as the subject is known in this manner, the camcorder can recognize more accurately that person or the object.

It should be noted that as the storage means and learning means of the camcorder itself have a storage capacity limit or processing performance limit, a high-performance cloud service function with a database with the ability to recognize the given object more accurately may be provided by getting the functions of such storage means or leaning means performed by any other device on a network such as the Web. In that case, video shot may be sent from the camcorder to a cloud server on the network and an inquiry for something to recognize or learn may be submitted to the server.

In response, the cloud server on the network sends the meaning data of the subject or the background included in the video shot or the description data about a place or a person from the past through the present to the camcorder. In this manner, the camcorder can be used as a more intelligent terminal.

Although the first and second embodiments have been described as being implemented as a camcorder, that is just an example of the present disclosure and the present disclosure may be carried out in any other form. For example, in an alternative embodiment, some functions to be performed by hardware components in the camcorder described above may also be carried out using a software program.

Also, in the various embodiments of the present disclosure described above, the camcorder is supposed to generate and record 3D video. However, the shooting method and image processing method described above are also applicable in the same way to even an image capture device that generates only still pictures. The technique of the present disclosure can be used in an image capture device that shoots either video or a still picture.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An image capture device comprising:
   first and second shooting sections, each of which is configured to shoot an image of a subject, the first shooting section having an optical zoom function and the second shooting section not having an optical zoom function; and
   a signal processing section configured to generate, based on a first image shot by the first shooting section with optical zoom and a second image shot by the second shooting section without optical zoom, information indicating the amount of parallax between the first and second images, and generate, based on at least one of the states of the first and second images, a zoom power during shooting, and the tilt of the image capture device during shooting, control information indicating the degree of stereoscopic property of a 3D image to be generated based on the first and second images or indicating whether or not the 3D image needs to be output, and record the control information and the information indicating the amount of parallax,
   wherein the second shooting section has a larger number of pixels than the first shooting section, and
   wherein the signal processing section outputs a control signal instructing that a 3D image be shot if the number of pixels of a portion of the second image corresponding to the first image and the zoom power of the first shooting section fall within predetermined ranges and otherwise outputs a control signal instructing that a non-3D image be shot.

2. The image capture device of claim 1, wherein the signal processing section records integrated data in which the control information and the information indicating the amount of parallax are integrated.

3. The image capture device of claim 2, wherein the signal processing section generates a video stream based on the first and second images and writes the integrated data at a particular position in the video stream.

4. The image capture device of claim 1, wherein the second shooting section has a smaller aperture than the first shooting section.

5. The image capture device of claim 1, wherein the states of the first and second images are the number of pixels of a portion of the second image corresponding to the first image, or the amount of parallax of the subject included in the first and second images.

6. The image capture device of claim 1, wherein the signal processing section generates two images by matching the respective angles of view and the respective numbers of pixels of the first and second images, and calculates the amounts of parallax between the two images on a pixel-by-pixel basis, thereby generating information indicating the amount of parallax.

7. The image capture device of claim 1, wherein based on the amount of parallax and the zoom power of the first shooting section, the signal processing section performs the operation of generating the control information, the operation of determining whether or not the information indicating the amount of parallax needs to be recorded, or the operation of determining whether or not the 3D image needs to be generated.

8. An image capture device comprising:
   first and second shooting sections, each of which is configured to shoot an image of a subject, the first shooting section having an optical zoom function and the second shooting section not having an optical zoom function; and a signal processing section configured to generate, based on a first image shot by the first shooting section with optical zoom and a second image shot by the second shooting section without optical zoom, information indicating the amount of parallax between the first and second images, and determine whether or not the information indicating the amount of parallax needs to be recorded based on the states of the first and second images and/or a shooting condition, wherein the second shooting section has a larger number of pixels than the first shooting section, and wherein the signal processing section outputs a control signal instructing that a 3D image be shot if the number of pixels of a portion of the second image corresponding to the first image and the zoom power of the first shooting section fall within predetermined ranges and otherwise outputs a control signal instructing that a non-3D image be shot.

9. An image capture device comprising:

first and second shooting sections, each of which is configured to shoot an image of a subject, the first shooting section having an optical zoom function and the second shooting section not having an optical zoom function; and a signal processing section configured to generate, based on a first image shot by the first shooting section with optical zoom and a second image shot by the second shooting section without optical zoom, information indicating the amount of parallax between the first and second images, generate a 3D image based on the first image and an image to be generated from the information indicating the amount of parallax and the first image, and determine, based on at least one of the states of the first and second images, a zoom power during shooting, and the tilt of the image capture device during shooting, whether or not the 3D image needs to be generated, wherein the second shooting section has a larger number of pixels than the first shooting section, and wherein the signal processing section outputs a control signal instructing that a 3D image be shot if the number of pixels of a portion of the second image corresponding to the first image and the zoom power of the first shooting section fall within predetermined ranges and otherwise outputs a control signal instructing that a non-3D image be shot.

10. An image processing method comprising the steps of:

generating, based on a first image shot with optical zoom by a first shooting section of an image capture device having an optical zoom function and a second image shot without optical zoom by a second shooting section of the image capture device not having an optical zoom function and having a larger number of pixels than the first shooting section, information indicating the amount of parallax between the first and second images;

generating, based on at least one of the states of the first and second images, a zoom power during shooting, and the tilt of the image capture device during shooting, control information indicating the degree of stereoscopic property of a 3D image to be generated based on the first and second images or whether or not the 3D image needs to be output;

recording the control information and the information indicating the amount of parallax, and outputting a control signal instructing that a 3D image be shot if the number of pixels of a portion of the second image corresponding to the first image and the zoom power of the first shooting section fall within predetermined ranges and otherwise outputting a control signal instructing that a non-3D image be shot.

11. An image processing method comprising the steps of:

generating, based on a first image shot with optical zoom by a first shooting section of an image capture device having an optical zoom function and a second image shot without optical zoom by a second shooting section of the image capture device not having an optical zoom function and having a larger number of pixels than the first shooting section, information indicating the amount of parallax between the first and second images, determining, based on the states of the first and second images and/or a shooting condition, whether or not the information indicating the amount of parallax needs to be recorded, and outputting a control signal instructing that a 3D image be shot if the number of pixels of a portion of the second image corresponding to the first image and the zoom power of the first shooting section fall within predetermined ranges and otherwise outputting a control signal instructing that a non-3D image be shot.

12. An image processing method comprising the steps of generating, based on a first image shot with optical zoom by a first shooting section of an image capture device having an optical zoom function and a second image shot without optical zoom by a second shooting section of the image capture device not having an optical zoom function and having a larger number of pixels than the first shooting section, information indicating the amount of parallax between the first and second images;

determining, based on at least one of the states of the first and second images, a zoom power during shooting, and the tilt of the image capture device during shooting, whether or not the 3D image needs to be generated;

generating a 3D image based on the information indicating the amount of parallax, an image to be generated on the first image, and the first image itself, and outputting a control signal instructing that a 3D image be shot if the number of pixels of a portion of the second image corresponding to the first image and the zoom power of the first shooting section fall within predetermined ranges and otherwise outputting a control signal instructing that a non-3D image be shot.

* * * * *